(12) United States Patent
Kawara

(10) Patent No.: US 8,335,002 B2
(45) Date of Patent: Dec. 18, 2012

(54) INFORMATION PROCESSING APPARATUS, INFORMATION PROCESSING METHOD, AND STORAGE MEDIUM

(75) Inventor: Satoshi Kawara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 889 days.

(21) Appl. No.: 12/424,268

(22) Filed: Apr. 15, 2009

(65) Prior Publication Data
US 2009/0268239 A1    Oct. 29, 2009

(30) Foreign Application Priority Data
Apr. 28, 2008   (JP) .................. 2008-117188

(51) Int. Cl.
*G06F 3/12* (2006.01)
*G06F 15/00* (2006.01)
*G06K 1/00* (2006.01)

(52) U.S. Cl. .................. 358/1.15; 358/1.16; 358/1.2

(58) Field of Classification Search .................. None
See application file for complete search history.

(56) References Cited

U.S. PATENT DOCUMENTS

| | | | |
|---|---|---|---|
| 7,134,797 B2* | 11/2006 | Nishitani | 400/76 |
| 7,295,336 B2* | 11/2007 | Yoshida et al. | 358/1.15 |
| 7,301,656 B1* | 11/2007 | Nakagiri et al. | 358/1.15 |
| 2001/0019432 A1* | 9/2001 | Akiyama | 358/518 |
| 2002/0036665 A1* | 3/2002 | Shima | 347/5 |
| 2004/0098508 A1* | 5/2004 | Ishizuka et al. | 709/247 |
| 2006/0023244 A1 | 2/2006 | Mitsui | |
| 2006/0244988 A1* | 11/2006 | Oishi | 358/1.13 |
| 2007/0216939 A1* | 9/2007 | Wada et al. | 358/1.15 |
| 2008/0043285 A1* | 2/2008 | Nakagiri et al. | 358/1.15 |
| 2009/0066983 A1* | 3/2009 | Ishizuka et al. | 358/1.9 |

FOREIGN PATENT DOCUMENTS

| | | |
|---|---|---|
| JP | 2005-173801 A | 6/2005 |
| JP | 2005-271265 A | 10/2005 |
| JP | 2006-065839 A | 3/2006 |
| JP | 2007-102378 A | 4/2007 |

* cited by examiner

*Primary Examiner* — Satwant Singh

(74) *Attorney, Agent, or Firm* — Canon USA Inc IP Division

(57) ABSTRACT

An information processing apparatus determines whether a combination of print setting data and drawing data is a standard combination. The information processing apparatus converts the drawing data into drawing data of another format or converts the drawing data into image data if the combination of the print setting data and the drawing data is determined not to be the standard combination.

9 Claims, 22 Drawing Sheets

FIG. 12

| STANDARD COMBINATION TABLE | | |
|---|---|---|
| COMBINATION TYPE | PRINT SETTING DATA FORMAT | DRAWING DATA FORMAT |
| STANDARD A | PRINT SETTING DATA FORMAT A (e.g., PRINT TICKET) | DRAWING DATA FORMAT A (e.g., XPS) |
| STANDARD B | PRINT SETTING DATA FORMAT B (e.g., JDF) | DRAWING DATA FORMAT B (e.g., PDF) |

FIG. 13

| | PRINT SETTING SUPPORT MANAGEMENT TABLE | |
|---|---|---|
| SETTING ITEM | PRINT SETTING DATA FORMAT A (e.g., PRINT TICKET) | PRINT SETTING DATA FORMAT B (e.g., JDF) |
| PRINT SIZE | ○ | ○ |
| PRINT SIDE | ○ | ○ |
| LAYOUT | ○ | ○ |
| COLOR/MONOCHROME | ○ | ○ |
| WATERMARK | ○ | × |
| PAGE EXCEPTION SETTING | × | ○ |
| PRIORITY PRINT | × | ○ |
| ⋮ | ⋮ | ⋮ |

FIG. 14

```xml
<?xml version="1.0" encoding="UTF-8" ?>
<psf:PrintTicket xmlns:psf=" http://schemas.microsoft.
com/windows/2003/08/printing/printschemaframework" >
```

PRINT SIZE SETTING
```xml
 <psf:Feature name=" psk:PageMediaSize" >
  <psf:Option name=" psk:ISOA4" >
   <psf:ScoredProperty name=" psk:MediaSizeWidth" >
    <psf:Value xsi:type=" xsd:integer" >210000</psf:Value>
   </psf:ScoredProperty>
   <psf:ScoredProperty name=" psk:MediaSizeHeight" >
    <psf:Value xsi:type=" xsd:integer" >297000</psf:Value>
   </psf:ScoredProperty>
  </psf:Option>
 </psf:Feature>
```

PRINT SIDE SETTING
```xml
 <psf:Feature name=" psk:DocumentDuplex" >
  <psf:Option name=" psk:One Sided" >
   <psf:Property name=" psf:IdentityOption" >
    <psf:Value xsi:type=" xsd:string" >True</psf:Value>
   </psf:Property>
  </psf:Option>
 </psf:Feature>
```

LAYOUT SETTING
```xml
 <psf:Feature name=" psk:DocumentNUp" >
  <psf:Option>
   <psf:ScoredProperty name=" psk:PagesPerSheet" >
    <psf:Value xsi:type=" xsd:integer" >1</psf:Value>
   </psf:ScoredProperty>
   <psf:Property name=" psk:IdentityOption" >
    <psf:Value xsi:type=" xsd:string" >True</psf:Value>
   </psf:Property>
  </psf:Option>
 </psf:Feature>
```

COLOR/MONO-CHROME SETTING
```xml
 <psf:Feature name=" psk:PageOutputColor" >
  <psf:Option name=" psk:Color" >
    <psf:ScoredProperty name=" psk:DeviceBitsPerPixel" >
     <psf:Value xsi:type=" xsd:integer" >24</psf:Value>
    </psf:ScoredProperty>
    <psf:ScoredProperty name=" psk:DriverBitsPerPixel" >
     <psf:Value xsi:type=" xsd:integer" >24</psf:Value>
    </psf:ScoredProperty>
  </psf:Option>
 </psf:Feature>
```

WATERMARK SETTING
```xml
 <psf:Feature name=" psk:PageWatermarkPrint" >
  <psf:Option name=" WatermakText" >
   <psf:ScoredProperty name=" psk:Text" >
    <psf:ParameterRef name=" Confidential" />
   </psf:ScoredProperty>
  </psf:Option>
 </psf:Feature>
</psf:PrintTicket>
```

FIG. 15

| DRAWING DATA FORMAT SUPPORT MANAGEMENT TABLE | | | |
|---|---|---|---|
| | | DRAWING DATA FORMAT A (e.g., XPS) | DRAWING DATA FORMAT B (e.g., PDF) |
| ITEM IN DRAWING DATA | EMBEDDED FONT | ○ | ○ |
| | NON-EMBEDDED FONT | × | ○ |
| | GROUPED OBJECT | ○ | × |
| | IMAGE DATA IN PING, TIFF, OR WINDOWS MEDIA PHOTO FORMAT | ○ | × |
| | ⋮ | ⋮ | ⋮ |

FIG. 16

```
<FixedPage Width=" 793.76" Height=" 1122.56" xmlns=" http://schemas.microsoft.com/xps/2005/06"
xml:lang=" und" >
    <Path Data=" M 115.52,135.84 L682.4,135.84 682.4,560.96 115.52,560.96 z" >
        <Path.Fill>
            <ImageBrush ImageSource=" 1.BMP" />
        </Path.Fill>
    </Path>
</FixedPage>
```

FIG. 17

IMAGE DATA:
```
%PDF-1.3
1 0 obj<</Type/XObject/Subtype/Image/Width 1024/Height 768/ColorSpace/DeviceRGB/
BitsPerComponent8/Length 2359296>>
stream
-Image Data
endstream
endobj
```

DRAWING EXECUTION COMMAND:
```
2 0 obj
<</Length 79>>
stream
q
425.128296 0.000000 0.000000 318.816193 86.633530 421.191315 cm
/Image1 Do
Q
endstream
endobj
```

PDF CONFIGURATION INFORMATION:
```
3 0 obj
<<
/Type
/Page
/MediaBox[0 0 595.20 841.80]
/Parent 4 0 R
/Resources<</ProcSet[/PDF/ImageC]/XObject<</Image1 1 0 R>>>>
/Contents[2 0 R]
>>
endobj
4 0 obj
<<
/Type
/Pages
/Kids[3 0 R]
/Count 1
>>
endobj
5 0 obj
<<
/Type
/Catalog
/Pages 4 0 R
/ViewerPreferences<</Direction/L2R>>
>>
endobj
xref
0 6
0000000000 65535 f
0000000015 00000 n
0002359452 00000 n
0002359578 00000 n
0002359734 00000 n
0002359791 00000 n
trailer
<<
/Size 6
/Root 5 0 R
>>
startxref
2359877
%%EOF
```

FIG. 21

```
<?xml version=" 1.0" encoding=" UTF-8" ?>
<psf:PrintTicket xmlns:psf=" http://schemas.microsoft.com/windows/2003/08/
printing/printschemaframework" >
  <psf:Feature name=" psk:PageMediaSize" >
    <psf:Option name=" psk:ISOA4" >
      <psf:ScoredProperty name=" psk:MediaSizeWidth" >
        <psf:Value xsi:type=" xsd:integer" >210000</psf:Value>
      </psf:ScoredProperty >
      <psf:ScoredProperty name=" psk:MediaSizeHeight" >
        <psf:Value xsi:type=" xsd:integer" >297000</psf:Value>
      </psf:ScoredProperty >
    </psf: Option>
  </psf:Feature >
```
— PRINT SIZE SETTING

```
  <psf:Feature name=" psk:DocumentDuplex" >
    <psf:Option name=" psk:Ooe Sided" >
      <psf:Property name=" psf:IdentityOption" >
        <psf:Value xsi:type=" xsd:string" >True</psf:Value>
      </psf:Property>
    </psf: Option>
  </psf:Feature >
```
— PRINT SIDE SETTING

```
  <psf:Feature name=" psk:DocumentNUp" >
    <psf: Option>
      <psf:ScoredProperty name=" psk:PagesPerSheet" >
        <psf:Value xsi:type=" xsd:integer" >1</psf:Value>
      </psf:ScoredProperty >
      <psf:Property name=" psk:IdentityOption" >
        <psf:Value xsi:type=" xsd:string" >True</psf:Value>
      </psf:Property>
    </psf: Option>
  </psf:Feature >
```
— LAYOUT SETTING

```
  <psf:Feature name=" psf:PageOutputColor" >
    <psf:Option name=" psk:Color" >
      <psf:ScoredProperty name=" psk:DeviceBitsPerPixel" >
        <psf:Value xsi:type=" xsd:integer" >24</psf:Value>
      </psf:ScoredProperty >
      <psf:ScoredProperty name=" psk:DriverBitsPerPixel" >
        <psf:Value xsi:type=" xsd:integer" >24</psf:Value>
      </psf:ScoredProperty >
    </psf: Option>
```
— COLOR/MONOCHROME SETTING

FIG. 22

```
<?xml version="1.0" encoding="UTF-8" ?>
<JDF ID="J1" ..... >
  <ResourcePool>

<Media ID="RES_000" Class="Consumable" Status="Available" Dimension="595 842" >
  <LayoutPreparationParams Class="Parameter" ID="IDLPP" Status="Available" Sides="OneSidedFront" />
  <LayoutPreparationParams Class="Parameter" ID="IDLPP" Status="Available" NumberUp="OneSidedFront" />
  <ColorantControl Class="Parameter" ID="IDCC" Status="Available" ProcessColorModel="DeviceCMYK" />
  : : :
  : : :
  <ResourcePool>
  : : :
  : : :
</JDF>
```

PRINT SIZE SETTING
PRINT SIDE SETTING
LAYOUT SETTING
COLOR/MONOCHROME SETTING

FIG. 23

| STORAGE MEDIUM SUCH AS FD, CD-ROM |
|---|
| DIRECTORY INFORMATION |
| PROGRAM CODE CORRESPONDING TO STEPS OF FLOWCHART IN FIG. 11 |
| PROGRAM CODE CORRESPONDING TO STEPS OF FLOWCHART IN FIG. 20 |
| |

INFORMATION PROCESSING APPARATUS, INFORMATION PROCESSING METHOD, AND STORAGE MEDIUM

BACKGROUND OF THE INVENTION

1. Field of the Invention

The present invention relates to information processing in an information processing apparatus for processing a document file according to print setting data.

2. Description of the Related Art

Print data required when printing a document from a computer, such as a personal computer (PC), includes two general types of data, which are print setting data describing a format and input/output setting according to a printer, and drawing data (hereinafter, the drawing data is simply called a document file) for reproducing an actual document file.

An application program running on a computer converts print data into command data dedicated for a printer via a printer driver, and transmits the data to the printer, to perform printing (hereinafter this printing method is called a printer driver printing).

Conventionally, in the printer driver printing in Microsoft Windows®, a memory block called a DEVMODE structure is used as print setting data. The DEVMODE structure is a memory area for holding information related to device initialization and printer environment and is featured by including two areas, which are a public portion whose specification is disclosed and a private portion whose specification is not disclosed and which can be accessed by only the printer driver.

Generally, in the public portion of the DEVMODE structure, only a basic part, such as sheet, sheet orientation, and resolution, is described, and the remaining most part is described in the private portion. The public portion of the DEVMODE structure is strictly specified as a header file for C language by Microsoft Corporation.

On the other hand, the private portion of the DEVMODE structure, individually defined by each printer driver developing company, follows the end of the public portion in the DEVMODE structure. Since a specification of the private portion, which occupies the most part of the DEVMODE structure, can be defined freely by each printer vender, the content of the specification is different for each company, which is thus not publicly disclosed.

As mentioned above, in a printing system by the printer driver (DEVMODE), there is a private area individually defined by each vendor in the print setting data. Therefore, the printing system by the printer driver (DEVMODE) cannot be used in a printing system, such as print on demand (POD), which requires a plurality of processes.

To solve this problem, an industry standard print setting data format not including an individual format has been formulated.

An example is Job Definition Format (JDF). JDF is featured in that it is described by Extensible Markup Language (XML), its specification is disclosed, and it is readable because it is text. JDF is becoming acknowledged as a standard format of print setting data. In the POD industry, a printing system in which JDF is used as the print setting data and Portable Document Format (PDF) is used as a document file is widely used. With the use of the above system, printers compatible with JDF/PDF are becoming widely used. Such a printing system is called PDF direct printing.

On the other hand, in a next generation printing system of Microsoft Corporation, an XML based format called a print ticket is employed as print setting data, and a format called XML Paper Specification (XPS) is employed as a document file. The next generation system is a system employed in Windows® Vista. The print ticket, which is this new print setting data format, has the same features as those of JDF, i.e., it is described by XML, its specification is disclosed, and it is readable because it is text.

From now on, it is expected that a printing system of print ticket/XPS will be widely used, and with the wide use of the printing system, printers will be more compatible with direct printing for print ticket/XPS.

Conventionally, there was a kind of separation in printing systems, such as the printer driver printing for office printing and the JDF/PDF direct printing for POD printing.

However, since a standardized format called print ticket appears for the print setting data in the printing system of Windows® Vista, it can be considered that the direct printing for print ticket/XPS will prevail as a printing system in a field of POD printing.

Generally, there are differences in items settable in each print setting data format.

For example, basic setting items such as a print size (sheet size), a print side (one-sided printing and two-sided printing) can be set in each print setting data format.

However, for example, although a watermark setting can be set in the print ticket, it cannot be set in JDF. On the contrary, although JDF has a concept of page minus, the print ticket does not have the concept, so that page minus cannot be set in the print ticket. The page minus is an effective setting method when a total number of document pages is not known. For example, when it is desired to print the last page in color, the page minus enables making a setting such as "print the page −1 in color". Thus, there are setting enabled items and setting disabled items depending on the print setting data format.

As conventional techniques under an environment in which such a plurality of print setting data formats and document file formats (drawing data formats) exist, there are techniques as follows:

In an environment in which a plurality of document files can be interpreted, it is determined whether an interpreter can interpret an input document file format, and when the interpreter can interpret it, the interpreter rasterizes the document data.

On the other hand, if the interpreter cannot interpret the input document file format, the document file is converted into an interpretable document file format, and then, the interpreter rasterizes the document data to print out the input document file. The above technique is discussed in Japanese Patent Application Laid-Open No. 2005-173801.

In addition, uninterpretable information in the print setting data is converted into interpretable information and set in the print setting data. Thus, print data that is set by another printing system and cannot be interpreted by a printer driver or a printing apparatus is made to be interpretable for the printer driver or the printing apparatus. The above technique is discussed in Japanese Patent Application Laid-Open No. 2006-065839.

As mentioned above, when there are a plurality of standardized formats, the printing system also needs to be compatible with the plurality of formats. In such an environment, it is expected that a user desires to set the print setting and execute printing without considering which print setting data format can specify which print setting.

Further, when printing, the user may desire to change the print setting, without using a previously generated combination of the print setting data and the document file.

For example, there is a case where a user does not desire to use predetermined print setting data and desires to hold print setting data for each user ("favorites" function in a printer driver) and to frequently print the document file with the setting.

However, the technique discussed in Japanese Patent Application Laid-Open No. 2005-173801 determines whether the document file format can be handled in a printing apparatus and converts the document file if the document file cannot be handled. Therefore, the technique does not address a case where the printing apparatus can handle a plurality of document files. In short, it is not mentioned which document file format is to be used when a plurality of document files can be handled.

In addition, the technique discussed in Japanese Patent Application Laid-Open No. 2006-065839 converts a print setting item that cannot be handled in the printer driver or the printing apparatus into another interpretable item. The technique does not address a case where the print setting data format itself is different.

As mentioned above, user-desired printing cannot be performed in an environment in which printing with a plurality of print setting data formats and document file formats (drawing data formats) can be performed.

SUMMARY OF THE INVENTION

The present invention is directed to a method for generating a combination in which formats of print setting data and a document file can be processed.

According to an aspect of the present invention, an information processing apparatus includes a determination unit configured to determine whether a combination of print setting data and drawing data is a standard combination, and a conversion unit configured to convert the drawing data into drawing data of another format or to convert the drawing data into image data if the combination of the print setting data and the drawing data is determined not to be the standard combination by the determination unit.

According to another aspect of the present invention, an information processing apparatus includes a determination unit configured to determine whether a combination of print setting data and drawing data is a standard combination, and a conversion unit configured to convert the print setting data into print setting data of another format or to convert the drawing data into drawing data of another format if the combination of the print setting data and the drawing data is determined not to be the standard combination by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates an example of a standard combination table held in the document information management unit illustrated in FIG. 2.

FIG. 13 illustrates an example of a print setting support management table managed by a print setting data processing unit illustrated in FIG. 2.

FIG. 14 illustrates an example of print setting data generated by the print setting data processing unit illustrated in FIG. 2.

FIG. 15 illustrates an example of a drawing data format support management table managed by a drawing data processing unit illustrated in FIG. 2.

FIG. 16 illustrates a page of data in an XPS document handled by a management apparatus according to an exemplary embodiment of the present invention.

FIG. 17 illustrates an example of a PDF document handled by the information processing apparatus according to an exemplary embodiment of the present invention.

FIG. 21 illustrates an example of a print setting file handled by the information processing apparatus according to an exemplary embodiment of the present invention.

FIG. 22 illustrates an example of a print setting file handled by the information processing apparatus according to an exemplary embodiment of the present invention.

FIG. 23 illustrates a memory map of a storage medium for storing various data processing programs readable by the information processing apparatus according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
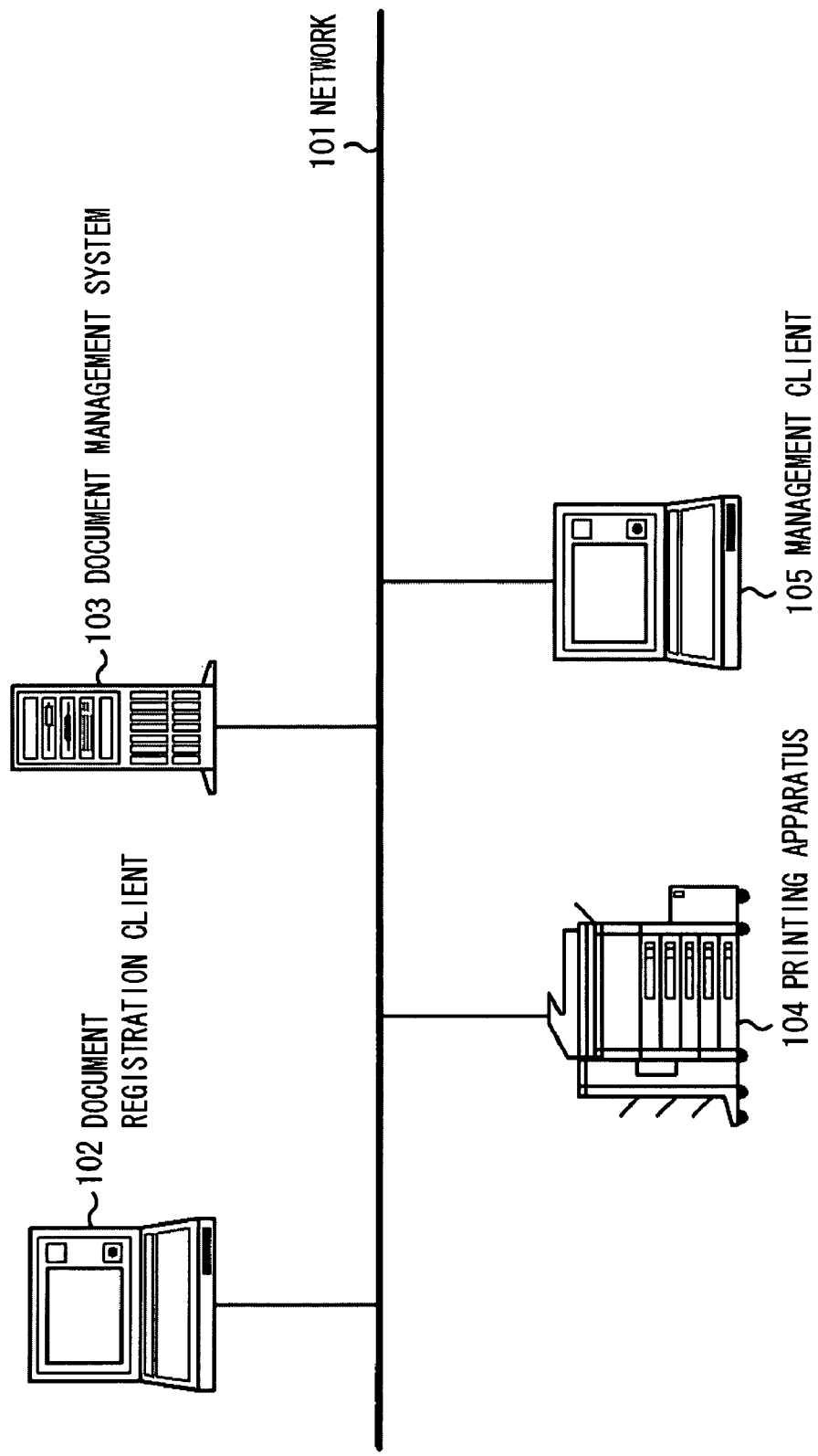
FIG. 1 is a block diagram illustrating an information processing system according to an exemplary embodiment of the present invention.

FIG. 1 is a block diagram illustrating an information processing system according to a first exemplary embodiment of the present invention. It is assumed that, in this system, a single or plurality of document registration clients 102, a single or plurality of printing apparatuses 104, and a single or plurality of management clients 105 are connected.

In FIG. 1, the document registration client 102, a document management system server (document management system) 103, and the management client 105 are information processing apparatuses, and can execute various programs such as application programs. In addition, the printing apparatus 104 also includes an information processing apparatus and can execute various programs such as application programs.

Furthermore, the document registration client 102, the document management system 103, the printing apparatus 104, and the management client 105 are connected to a network 101, such as a local area network (LAN), a wide area network (WAN), and the Internet, via a cable, and can communicate with each other.

The printing apparatus 104 is a multifunction peripheral (MFP), which is an example of an image output apparatus. The printing apparatus 104 receives an electronic document, a document file (print information including character codes, images, and control codes) coded in a page-description language (PDL), and print setting data for instructing a print format, such as bookbinding, from a computer via the network 101. The printing apparatus 104 stores the print data in a predetermined memory, generates a corresponding character pattern, print image, and the like according to the print data, and forms an image on a recording sheet.

In addition, when the printing apparatus 104 does not have the information processing function to execute various programs such as application programs, the printing apparatus 104 can include a print control computer. Specifically, other than the printing apparatus 104, the print control computer (not illustrated in the figure) having an information processing function to execute various programs such as application programs is arranged. The print control computer receives a document print instruction, communicates with the document management system 103, and controls the printing apparatus 104. Hereinafter, the printing apparatus 104 includes both the printing apparatus having the information processing function and a combination of the printing apparatus and the print control computer.

The document management system 103 includes an application program for generating print data (drawing data, print setting data) to be transmitted to the printing apparatus 104. Details will be described in description of a print setting data processing unit 103-6 and a drawing data processing unit 103-7.

The document management system 103 is an application server that manages users, documents, and printing apparatus information. The document management system 103 stores document related information, for example, an owner user, a document ID, a document file (drawing data), a print setting (print setting data), and make them referable.

In addition, with a web server function added to the document management system 103, the document management system can be accessed from the document registration client 102 or the management client 105 using a web browser. Alternatively, the document management system 103 can be accessed via a dedicated application (not limited to a web browser) running on the document registration client 102, the printing apparatus 104, or the management client 105 using a communication protocol, such as Transmission Control Protocol/Internet Protocol (TCP/IP) or HyperText Transfer Protocol (HTTP).

A user, who intends to register a document to be printed, prepares the document to be printed by using the document registration client 102, specifies the print setting and the document file via the web browser/application, and registers them on the document management system 103.

The document management system 103 generates print setting data (print ticket or JDF data) and a document file (XPS data or PDF data) based on the print setting and the document file registered by the user.

A user (can be the same user who registers the document), who intends to print the document, refers to and downloads the document information, the print setting data, and the document file from the document management system 103, and performs an operation such as printing with the printing apparatus 104 via an operation panel. A manager manages the user with the management client 105 via the web browser/application.

Figure 2:
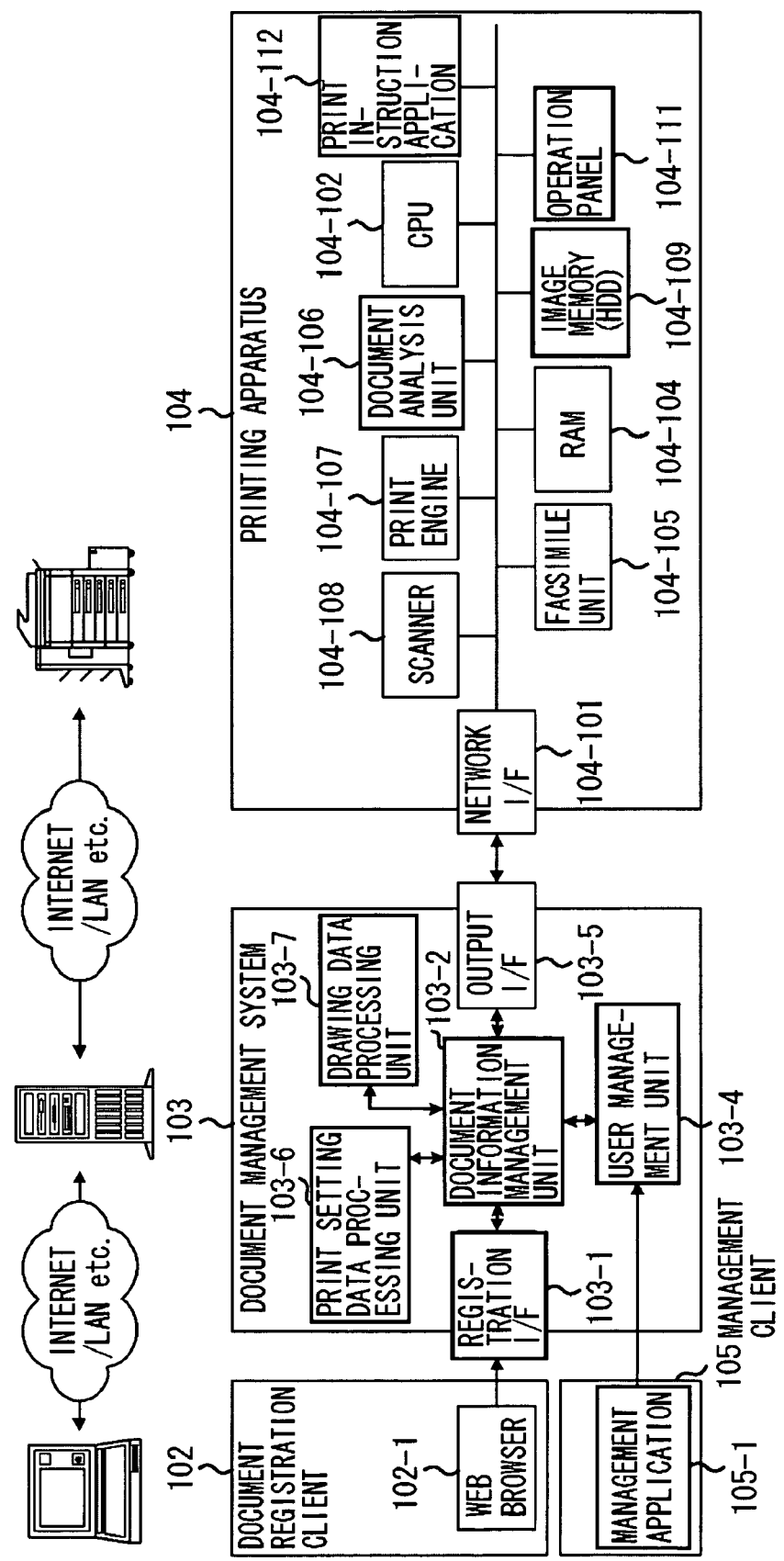
FIG. 2 is a view illustrating a module configuration of the information processing system according to an exemplary embodiment of the present invention.

FIG. 2 is a view illustrating a module configuration of the information processing system according to an exemplary embodiment of the present invention. First, major configuration modules will be described.

In FIG. 2, a web browser 102-1 runs on the document registration client 102.

In the document management system 103, a registration interface (I/F) 103-1 is an interface unit for a document registration client, and has a web-server function to accept a request by HTTP, Hypertext Transfer Protocol over Secure Socket Layer (HTTPS), and the like.

A document information management unit 103-2 makes a combination of the document information including the print setting data and the document file, associates the combination with a registered user identifier, and stores and manages them. A user management unit 103-4 manages the user information and the printing apparatus information. An output I/F 103-5 is an interface unit to the printing apparatus 104 (including a print control computer for controlling the printing apparatus) and has a web-server function to accept a request by HTTP, HTTPS, and the like.

A print setting data processing unit 103-6 analyses print setting items specified by the user via the web browser 102-1 and generates the print setting data. A drawing data processing unit 103-7 generates, from a document file input by a user via the web browser 102-1, a document file which can be processed by the printing apparatus 104 and whose print setting data corresponds to the input document file.

In the printing apparatus 104, a network I/F 104-101 functions as a connection unit to the network 101. A central processing unit (CPU) 104-102 contains a read only memory (ROM) storing a predetermined program and executes the program to perform various control operations and calculations of the printing apparatus 104.

An image memory 104-109 includes a hard disk drive (HDD), which is a non-volatile memory storing a print job. A random access memory (RAM) 104-104 includes a volatile memory temporarily storing a print job during print-out process.

A scanner 104-108 includes an optical scanning unit for reading an image from an original document and an image sensor such as CCD. A document analysis unit 104-106 analyzes the image read from the scanner 104-108 and the print job (print setting data, document file) received from the network I/F 104-101.

A print engine 104-107 outputs the print job analyzed by the document analysis unit 104-106 onto a recording sheet by an inkjet method or a laser beam method. A facsimile unit transmits the image data read by the scanner 104-108 through a telephone line and outputs image data received through a telephone line to the print engine 104-107. The Facsimile unit 104-105 also has a function for storing the read image data or the received image data into the image memory 104-109.

An operation panel 104-111 allows the user to perform various operations, such as displaying a list of document information and document files, selecting a document file to be printed, and instructing an execution of printing. A print instruction application 104-112 executes printing according to a print instruction received from the operation panel 104-111 and a management of the print job received from the network I/F 104-101.

The image data which is read from the scanner 104-108 and output as an image, and the image data received by the facsimile unit 104-105 are one of the print jobs, and the print instruction application 104-112 also manages both image data.

Between the network I/F 104-101 of the printing apparatus 104 and the output I/F 103-5 of the document management system 103, communication processing is performed so that the print job is not easily intercepted during communication on the network 101. Specifically, encryption and decryption (HTTPS, IPsec, PPTP, L2TP, etc.) on the communication are performed.

In the management client 105, a management application 105-1 runs and communicates with the user management unit 103-4 to provide a user management function.

Hereinafter, processing for registering a document to be printed in the document information management unit 103-2 from the document registration client 102 will be described.

Figure 3:
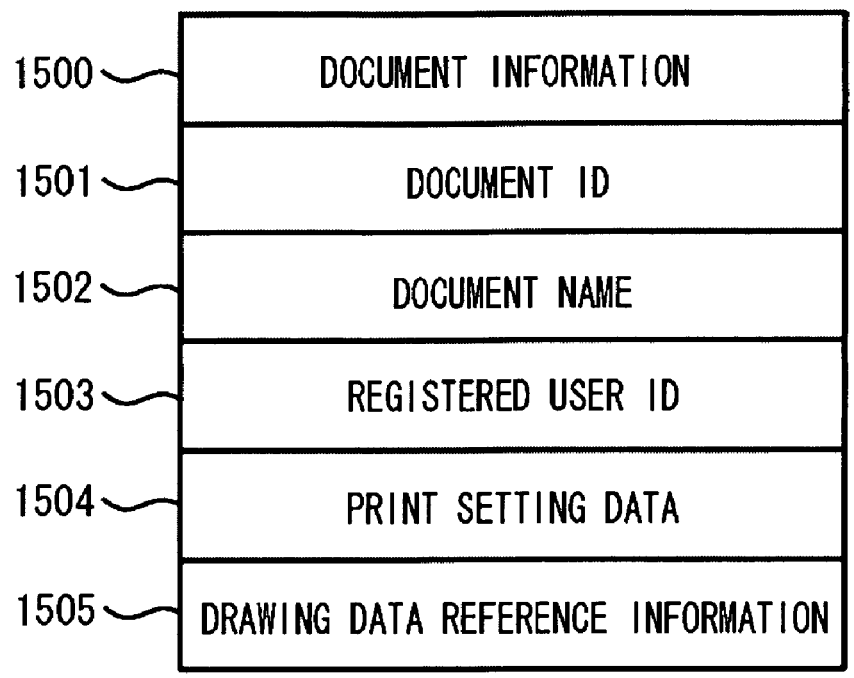
FIG. 3 illustrates an example of a data file format for storing document information data generated and managed by a document information management unit illustrated in FIG. 2.

FIG. 3 illustrates an example of a data file format for storing document information data generated and managed by a document information management unit 103-2 illustrated in FIG. 2.

As illustrated in FIG. 3, the document information 1500 is managed by associating a document name 1502, a user ID 1503 of a user who registered the document, print setting data 1504, and drawing data reference information 1505 with a document ID 1501.

Although the document file (drawing data) is also managed using association, the document file is managed separately from the document information data. The drawing data reference information 1505 is held in the document information. However, the document file (drawing data) can be held in the document information data.

Figure 4:
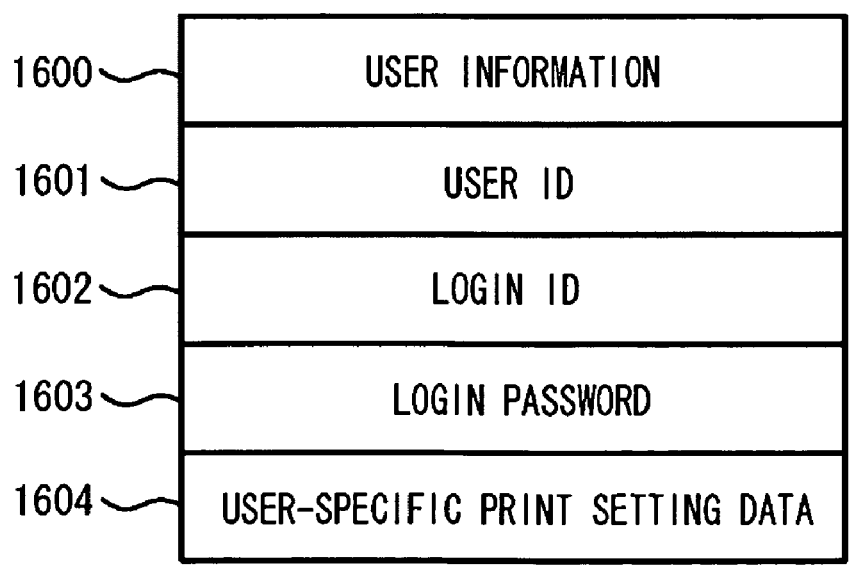
FIG. 4 illustrates an example of a data file format for storing user information generated and managed by a user management unit illustrated in FIG. 2.

FIG. 4 illustrates an example of a data file format for storing user information 1600 generated and managed by a user management unit 103-4 illustrated in FIG. 2.

As illustrated in FIG. 4, the user information 1600 is managed by associating a user ID 1601 for uniquely identifying a user with a login ID 1602, a login password 1603, and user-specific print setting data 1604.

The user-specific print setting data 1604 is print setting data that is used when the user wants to print in a different setting from the print setting data 1504 managed by being associated with the document file (drawing data) for each document.

Next, the user management performed by operating the management client 105 will be described with reference to FIGS. 4 and 5.

A management user (manager) operates the web browser or the management application 105-1 running on the management client 105 and accesses the user management unit 103-4.

Figure 5:
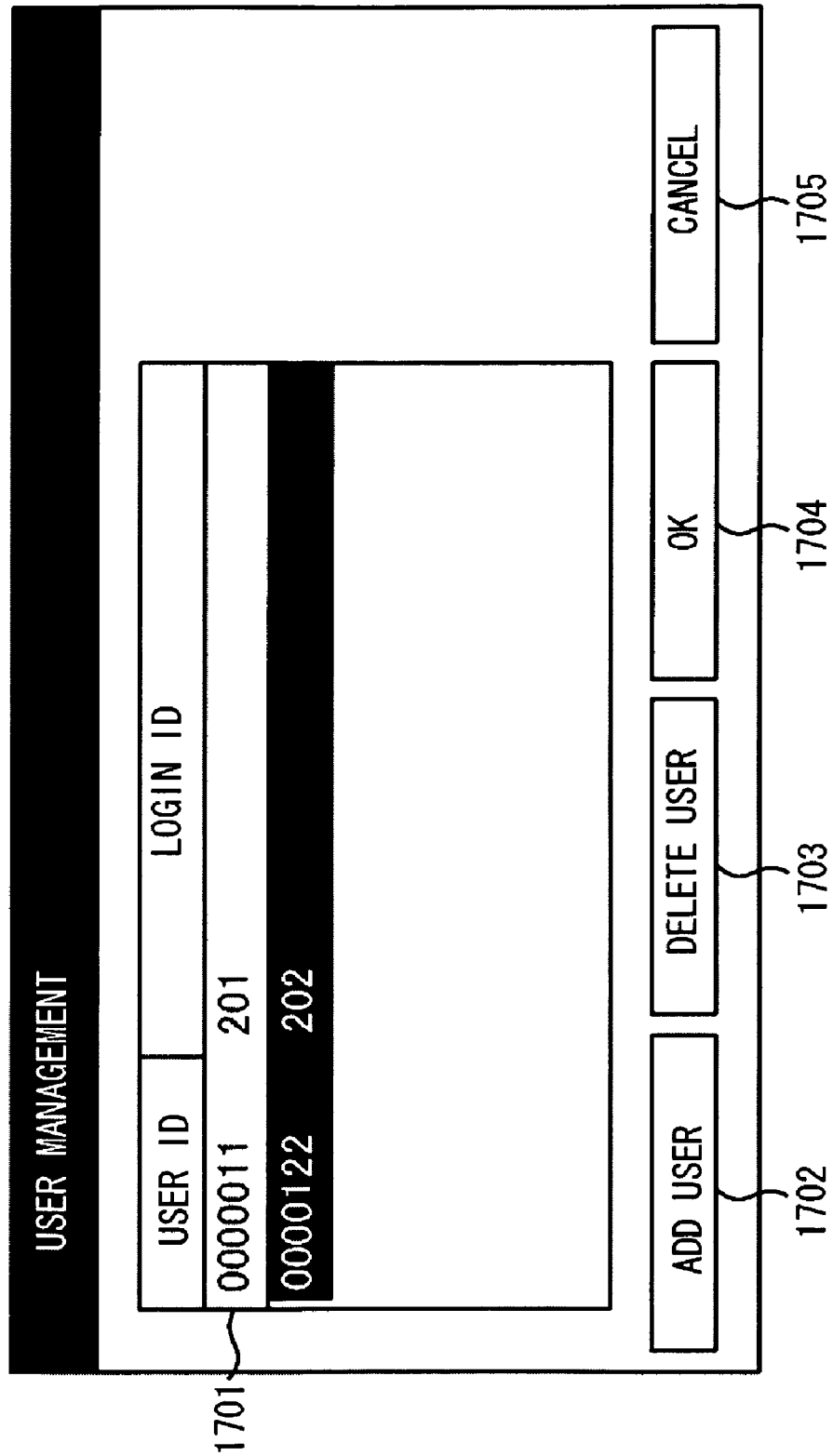
FIG. 5 illustrates an example of a user interface displayed on a management client illustrated in FIG. 2.

FIG. 5 illustrates an example of a user interface displayed on the management client 105 illustrated in FIG. 2. This example illustrates an example of a user management screen.

As illustrated in FIG. 5, in the user interface, a list of currently registered users is displayed. When selecting a user on the list, detailed information of the selected user is displayed in a lower part of the list, and various settings can be performed.

In FIG. 5, a user list 1701 includes the user ID 1601 and the login ID 1602 in the user information management table illustrated in FIG. 4. The management user can press various buttons, such as an add user button 1702, a delete user button 1703, an ok button 1704, and a cancel button 1705, to perform addition or deletion of a user.

The user management unit 103-4 sets the login password 1603 for each user ID 1601 when adding a user, generates the print setting data 1604 for each user, and manages them by associating with each other.

A plurality of user-specific print setting data 1604 can be registered for each user. The user-specific print setting data 1604 can be registered via the operation panel 104-111 after the user logins into the printing apparatus 104.

Next, a processing flow of a document registration in the exemplary embodiment will be described with reference to FIGS. 6 to 10.

The user operates the web browser 102-1 running in the document registration client 102 and accesses the registration I/F unit 103-1 via the network 101. Then, a menu selection form, an example of which is illustrated in FIG. 6, is received and displayed by the web browser 102-1.

FIGS. 6 to 10 each illustrate an example of a user interface displayed by the web browser 102-1 running in the document registration client 102 illustrated in FIG. 2.

Figure 6:
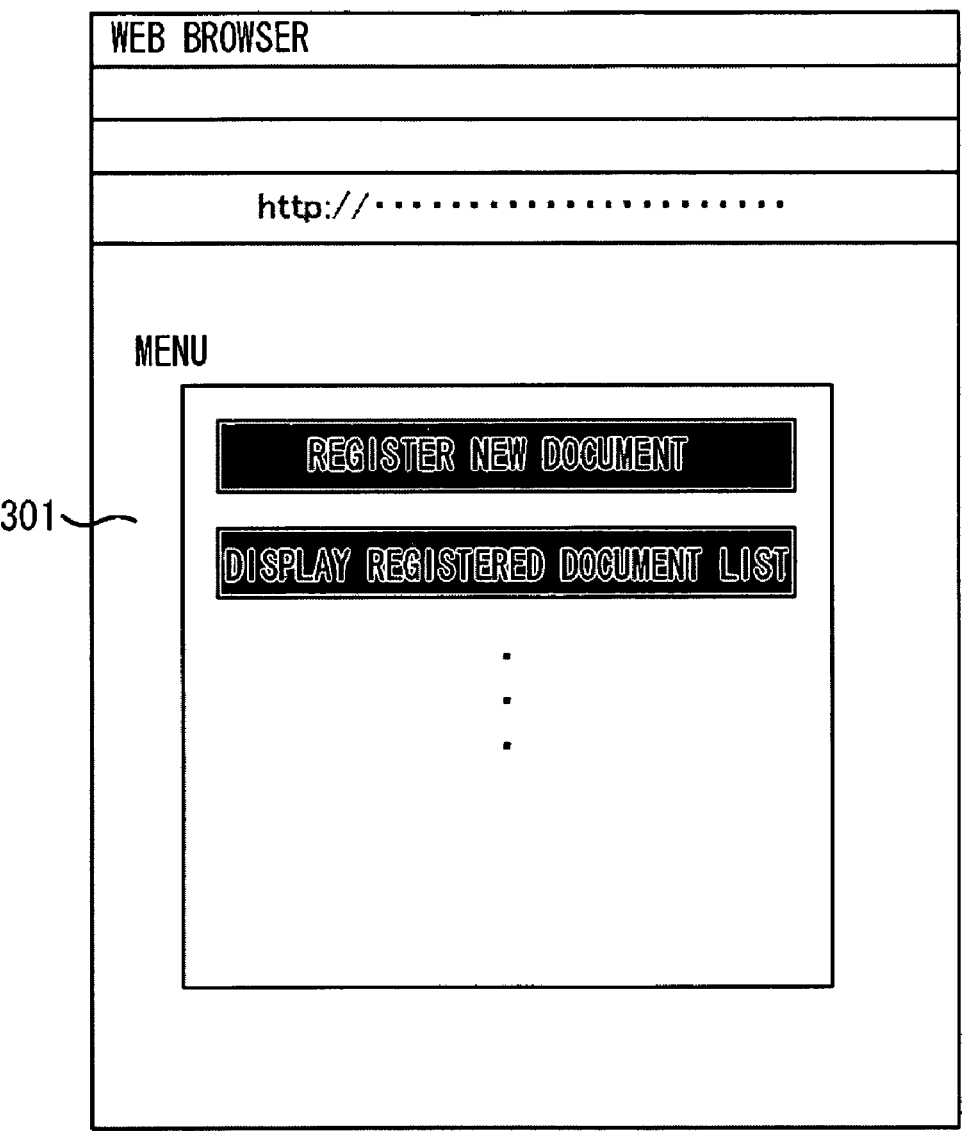
FIG. 6 illustrates an example of a user interface displayed by a web browser running in a document registration client illustrated in FIG. 2.

In FIG. 6, when the user selects a menu 301 corresponding to "Register new document", menu selection information is set in a menu selection form and transmitted from the document registration client 102 to the registration I/F unit 103-1.

Figure 7:
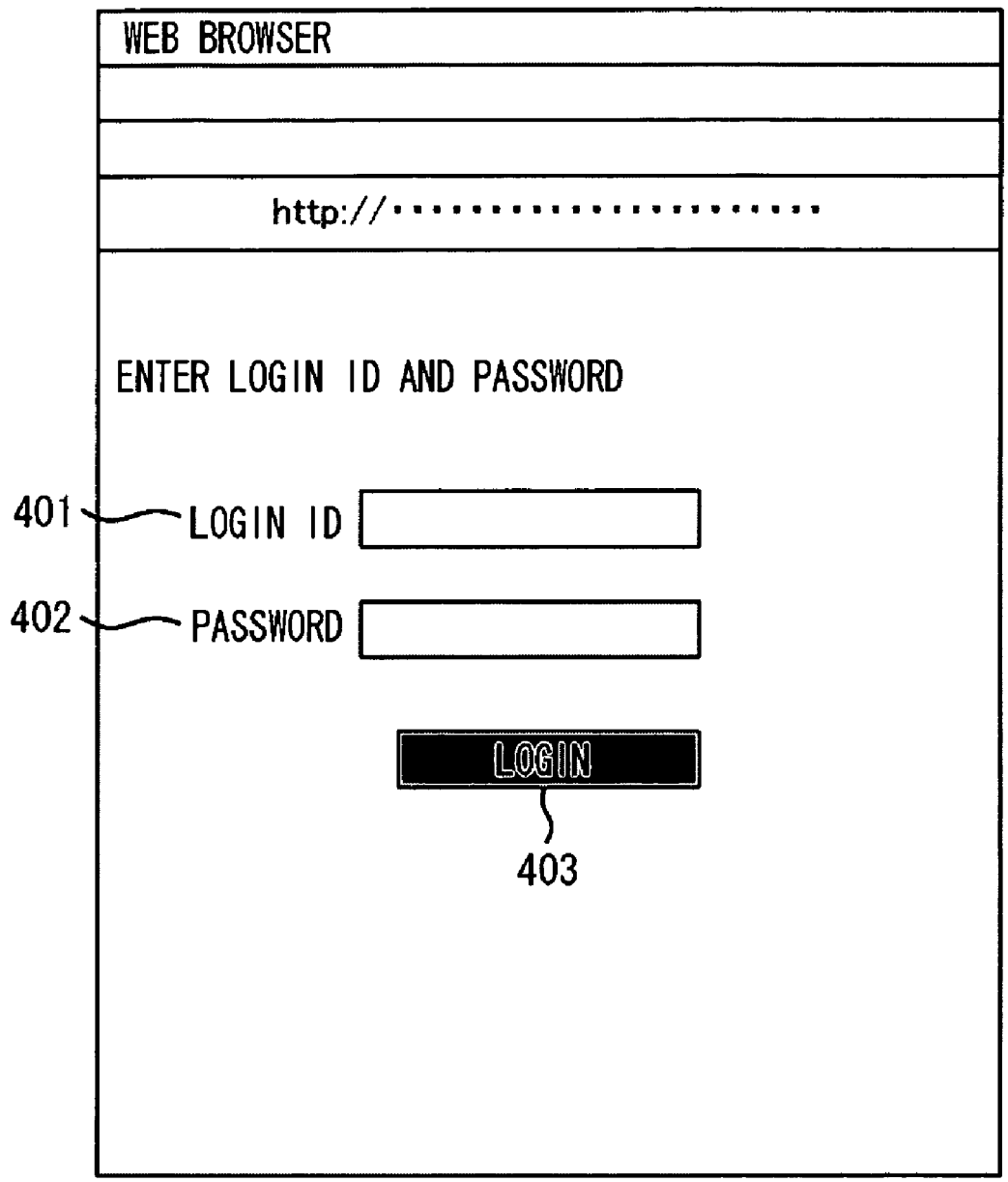
FIG. 7 illustrates an example of a user interface which is displayed by the web browser running in the document registration client illustrated in FIG. 2.

Next, the registration I/F unit 103-1 of the document management system 103 transmits a login screen form to the document registration client 102, and the login screen form, an example of which is illustrated in FIG. 7, is displayed by the web browser 102-1.

When the user enters a login ID 401 and a password 402 and presses a "Login" button 403, login information is set in the login screen form and transmitted to the registration I/F unit 103-1 of the document management system 103. The login information is transmitted to the user management unit 103-4 via the registration I/F unit 103-1 in the document management system 103, a user authentication is performed, and an authentication result is transmitted to the registration I/F unit 103-1.

Figure 8:
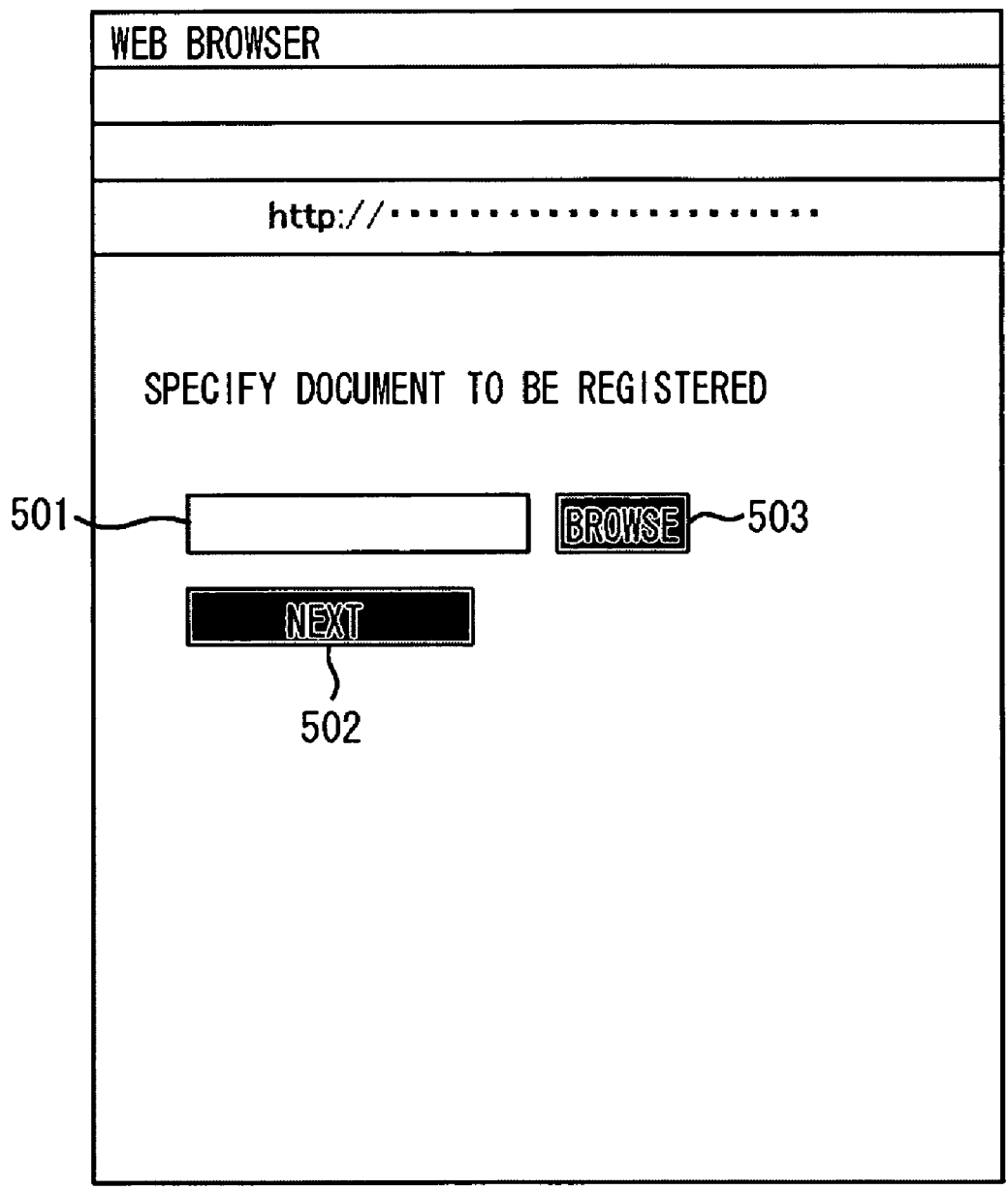
FIG. 8 illustrates an example of a user interface which is displayed by the web browser running in the document registration client illustrated in FIG. 2.

In this way, when it is confirmed that the user is a registered user in the system, subsequently, a registration document specification form, an example of which is illustrated in FIG. 8, is transmitted to the document registration client 102 and displayed by the web browser 102-1.

The user specifies a registration file name and a path in a registration file specification part 501 in the registration document specification form illustrated in FIG. 8 and presses a "Next" button 502. Thus, the document file specified in the registration file specification part 501 is transmitted to the registration I/F unit 103-1 of the document management system 103. A browse button 503 is used when specifying a document file which has been already registered.

The registration I/F unit 103-1 transfers the document file transmitted from the document registration client 102 to the document information management unit 103-2, and the document information management unit 103-2 stores the document file. The document file is held in a storage device included in the document management system 103.

Figure 9:
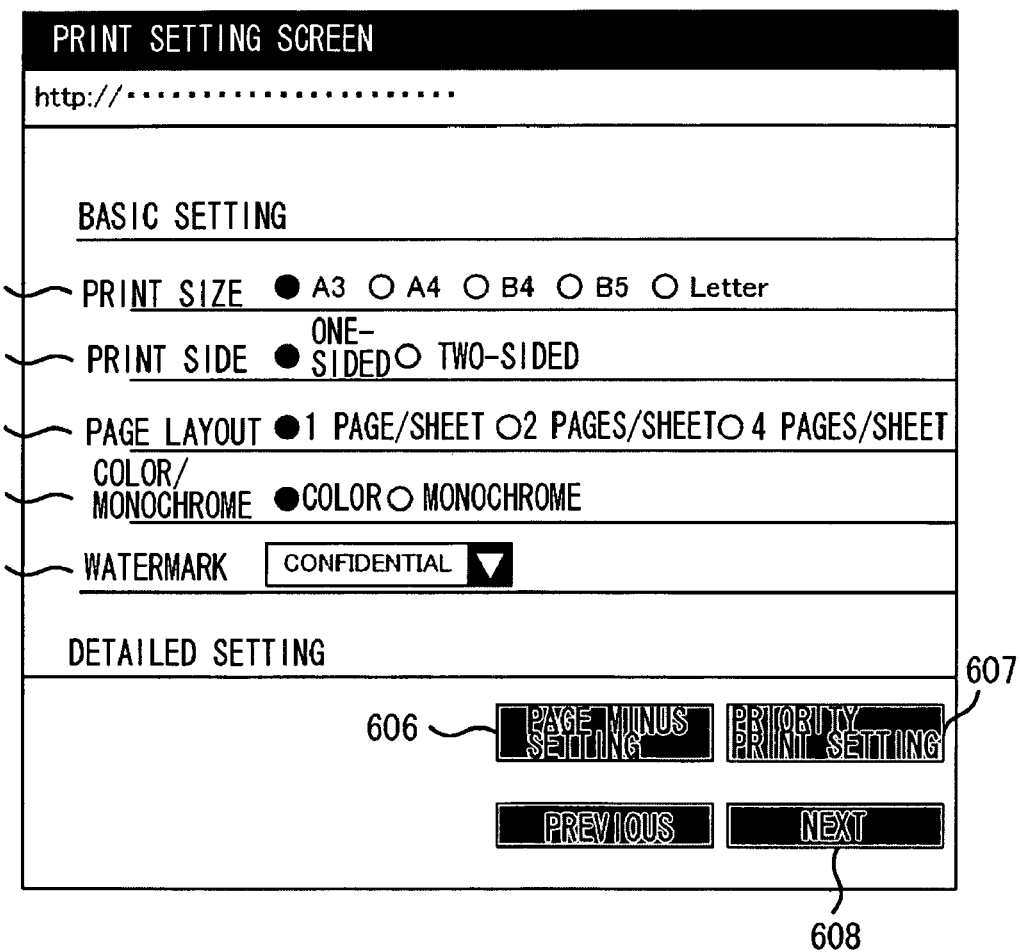
FIG. 9 illustrates an example of a user interface which is displayed by the web browser running in the document registration client illustrated in FIG. 2.

Next, the registration I/F unit 103-1 transmits a print setting information specification form, an example of which is illustrated in FIG. 9, to the document registration client 102, and the print setting information specification form is displayed by the web browser 102-1.

In the print setting information specification form illustrated in FIG. 9, as print settings when printing a document, print size 601, print side (one-sided/two-sided) 602, page layout 603, color/monochrome 604, watermark 605, page minus setting 606, priority print setting 607, and the like can be set. The user does not need to consider a combination of the print setting data format and the drawing data format (document file format) included in the document management system 103.

When the user specifies document information and presses a "Next" button 608, the specified print setting is set in a form and transmitted to the registration I/F unit 103-1 of the document management system 103. The registration I/F unit 103-1 of the document management system 103 transfers each print setting value which is input in the received print setting information specification form with a user ID of the login user to the document information management unit 103-2.

The document information management unit 103-2 controls the print setting data processing unit 103-6 to generate the print setting data from each print setting value. Also, the document information management unit 103-2 controls the drawing data processing unit 103-7 to convert the document file (drawing data) into a different format. Detailed methods of generating the print setting data and converting the document file (drawing data) will be described later below.

The document information management unit 103-2 associates the print setting data generated by the print setting data processing unit 103-6, the document file (drawing data) converted by the drawing data processing unit 103-7, and the user ID of the user who registered the document with each other. The document information management unit 103-2 issues a document ID and stores the information as the document information 1500.

Figure 10:
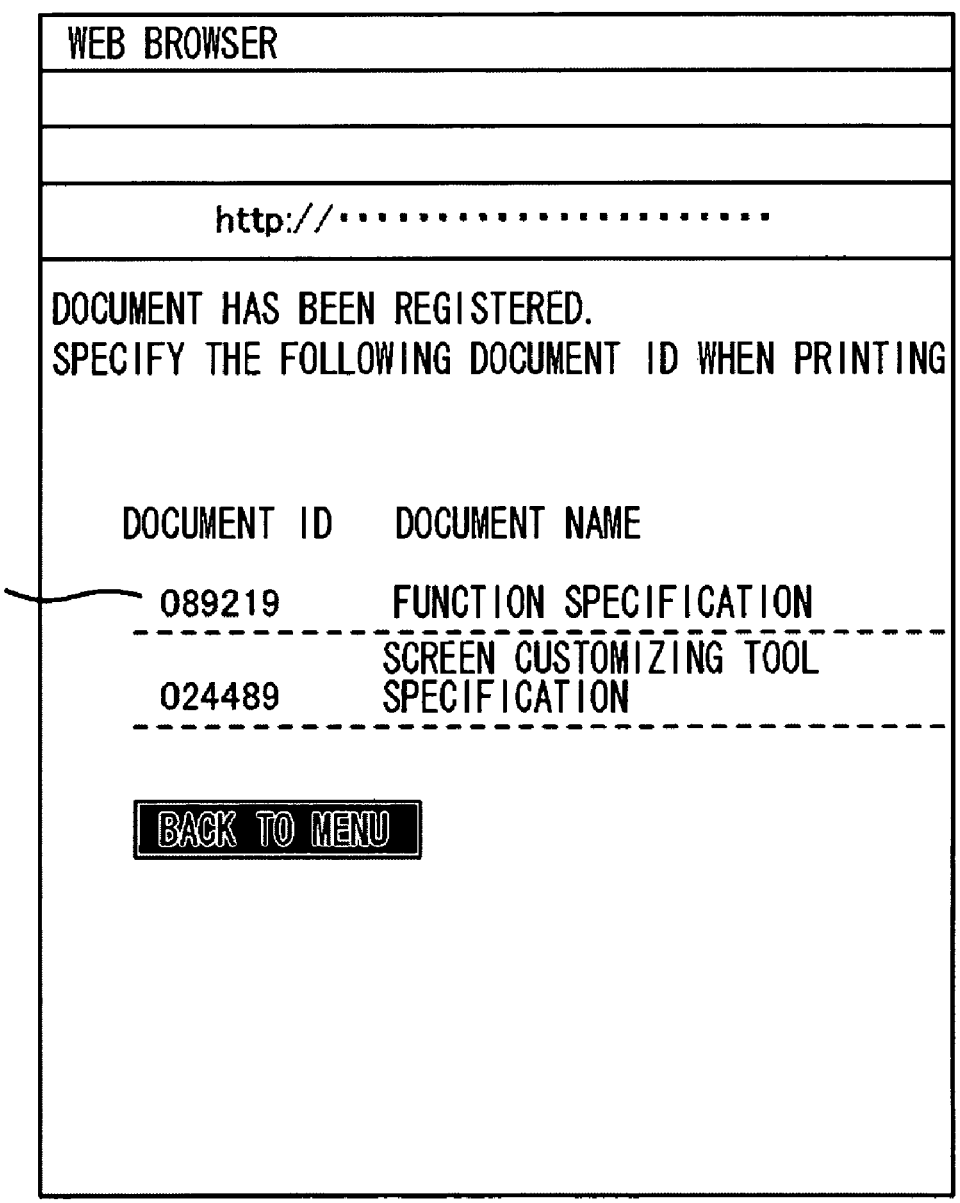
FIG. 10 illustrates an example of a user interface which is displayed by the web browser running in the document registration client illustrated in FIG. 2.

After that, the document information management unit 103-2 generates a document ID notification form including the document ID via the registration I/F 103-1 so that a document ID notification screen is displayed by the web browser 102-1, an example of which is illustrated in FIG. 10.

The user can print the document by using the document ID 701 displayed on the document ID notification screen illustrated in FIG. 10, on the printing apparatus 104. The document information here is managed and stored by a table as illustrated in FIG. 3.

Next, methods for generating the print setting data from each print setting value and converting the document file in the print setting data processing unit 103-6 and the drawing data processing unit 103-7 will be described with reference to a flow chart illustrated in FIG. 11.

Figure 11:
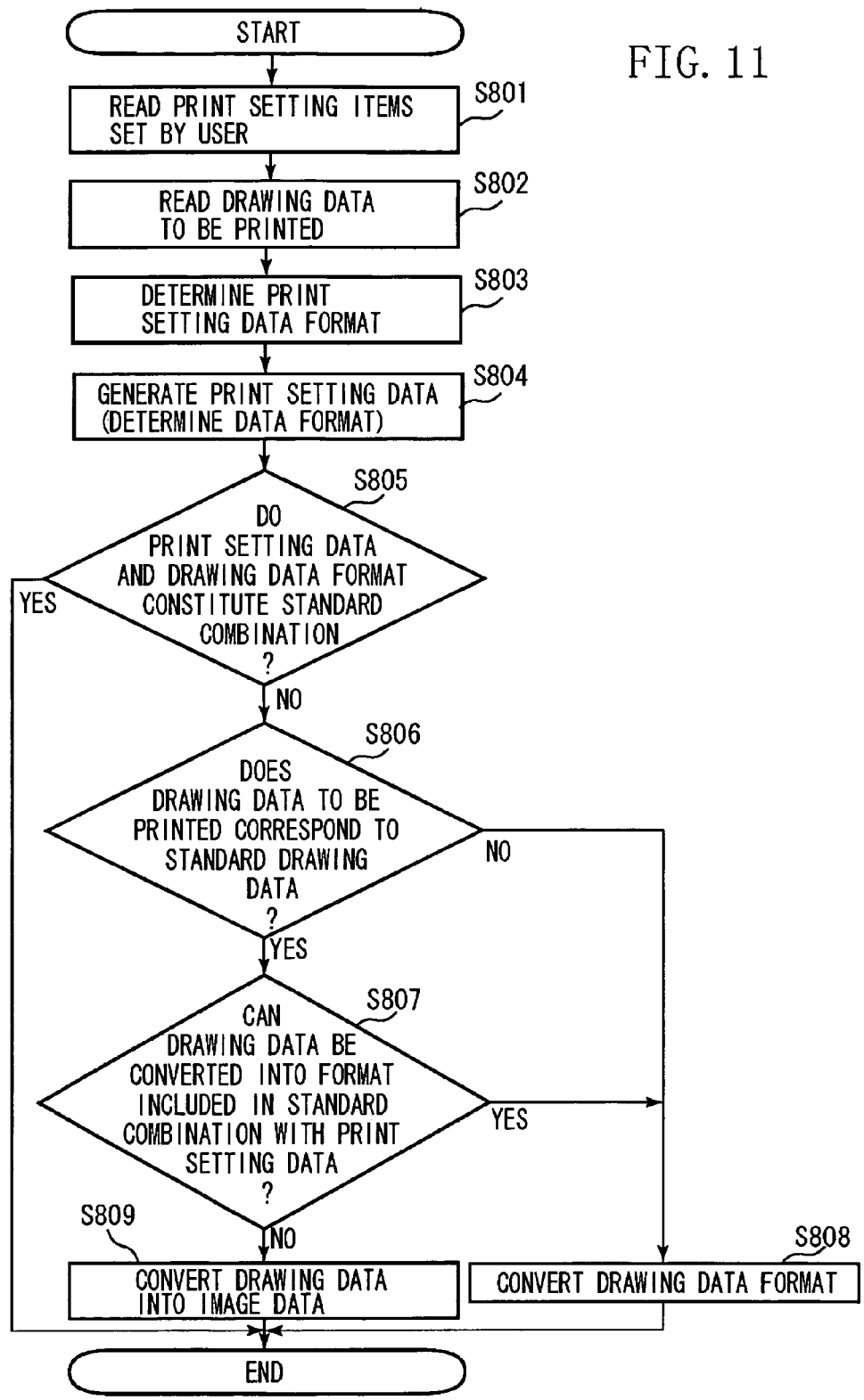
FIG. 11 is a flowchart illustrating an example of a data processing procedure in an information processing apparatus according to an exemplary embodiment of the present invention.

FIG. 11 is a flowchart illustrating an example of a data processing procedure in the information processing apparatus according to an exemplary embodiment of the present invention. This example is processing of generating the print setting data from each print setting value and converting into the document file by the print setting data processing unit 103-6 and the drawing data processing unit 103-7 of the document management system 103 illustrated in FIG. 2. Each step is implemented by the CPU of the document management system 103 executing the print setting data processing unit 103-6 and the drawing data processing unit 103-7.

First, in step S801, the print setting data processing unit 103-6 reads print setting items which a user input via the web browser 102-1 of the document registration client 102. Next, in step S802, the drawing data processing unit 103-7 reads a document file (drawing data) which the user input via the web browser 102-1.

In step S803, the print setting data processing unit 103-6 determines by which print setting data format the specified print setting can be represented.

The print setting data format includes print setting data formats listed in the print setting data format 1002 in the standard combination table 1000 illustrated in FIG. 12. Although two standard combinations are illustrated in the example of FIG. 12, the combination is not limited to the two.

FIG. 12 illustrates an example of a standard combination table held in the document information management unit 103-2 illustrated in FIG. 2. This table functions as a table for managing information that indicates which combination is a standard combination regarding formats of the print setting data and the document file (drawing data).

Although an example in which the combination table 1000 manages a plurality kinds of formats which are standard A and standard B in the combination type 1001 is illustrated, the number of standards is not limited to this. The standard combination table 1000 functions as a standard combination management table.

In FIG. 12, the standard A corresponds to a case where the print setting data format is, for example, a print ticket, and the drawing data format (document file data format) is, for example, XPS. In addition, the standard B corresponds to a case where the print setting data format is, for example, JDF, and the drawing data format (document file data format) is, for example, PDF.

In the determination in step S803, the print setting data processing unit 103-6 performs determination by comparing the print setting support management table 900 illustrated in FIG. 13 with the print setting items specified by the user via the web browser 102-1.

FIG. 13 illustrates an example of the print setting support management table managed by the print setting data processing unit 103-6 illustrated in FIG. 2. This is a table for holding information indicating whether each print setting item can be supported by each print setting data format.

In FIG. 13, the print setting support management table 900 holds "o" for each setting item 901 when the setting item can be represented by each print setting data format A or B. The print setting support management table 900 holds "x" when the setting item cannot be represented by each print setting data format A or B. This example shows a case where the setting items 901 includes print size 904, print side 905, page layout (layout) 906, color/monochrome 907, watermark 908, page exception setting 909, and priority print 910.

Therefore, in this example, for the watermark of the setting item 901, "o" is held because it can be represented by the print setting data format A, and "x" is held because it cannot be represented by the print setting data format B. Other setting items 901 are similarly set.

The print setting support management table 900 is generated by previously defining setting items which can be represented by the print setting data format and setting items which cannot be represented by the print setting data format.

In FIG. 13, although only two print setting data formats are described, it is possible to describe and manage three or more print setting data formats. Here, a specific example of the determination in step S803 will be described.

It is assumed that the user sets only the print size 904, the print side 905, the page layout 906, and the color/monochrome 907 corresponding to FIG. 13. In this case, by the print setting support management table 900, both the print setting data format A 902 and the print setting data format B 903 can be represented. Therefore, the print setting data processing unit 103-6 determines that the print setting set by the user can be represented by the print setting data format A 902 and the print setting data format B 903.

In addition to the above setting items, for example, when the watermark is set, the print setting data processing unit 103-6 determines that the print setting can be represented by only the print setting data format A in step S803. In addition, for example, when the user sets the print size, print side, page layout, color/monochrome, watermark, and priority print setting, there is no representable print setting data format in the print setting support management table 900.

The web browser 102-1 illustrated in FIG. 9 is controlled so that such a setting cannot be performed by the user. Specifically, when the user specifies the watermark setting in the screen illustrated in FIG. 9, a conflict control operation is performed such that the buttons corresponding to the page minus setting, priority print setting, etc., are grayed out and disabled to be specified.

Next, in step S804, the print setting data processing unit 103-6 determines either of print setting data formats A and B illustrated in FIG. 13 to be a format of the print setting data and generates the print setting data. In the determination processing in step S803, when it is determined that the print setting is represented by only either of the print setting data format A 902 or the print setting data format B 903, the print setting data is generated according to either of the print setting data formats.

For example, in the determination processing in step S803, when it is determined that the specified print setting items are represented by both the print setting data format A 902 and the print setting data format B 903, the flow proceeds as follows. In this case, the print setting data processing unit 103-6 refers to the standard combination table 1000 illustrated in FIG. 12 and determines the print setting data format, as mentioned below.

Specifically, the print setting data processing unit 103-6 determines the print setting data format from the drawing data format (document file format) read in step S802 to make a combination described in the combination type 1001 of the standard combination table 1000 illustrated in FIG. 12.

When the document file (drawing data) is the drawing data format A, the print setting data format A is generated, and when the document file (drawing data) is the drawing data format B, the print setting data format B is generated.

On the other hand, when the print setting data processing unit 103-6 determines that the drawing data format (document file format) is neither of the above formats, the user is made to select the print setting data. For example, it is possible to previously set the print setting data as default using a user interface for setting (not illustrated), or make the user specify the print setting data every time the drawing data format (document file format) is determined not to be either of the above formats.

After determining the print setting data format in this way, the print setting data according to the print setting data format is generated.

FIG. 14 illustrates an example of the print setting data generated by the print setting data processing unit 103-6 illustrated in FIG. 2. This example shows a case where the print setting data format is the print ticket corresponding to the print setting data format A.

The print setting data illustrated in FIG. 14 is a print ticket example whose settings are that the print size is A4, the print side is one-sided, the page layout is 1 page/sheet, the color/monochrome is color, and the watermark is on (CONFIDENTIAL).

FIG. 14 schematically illustrates the print ticket and does not correctly represent the print ticket specification.

After the print setting data processing unit 103-6 generates the print setting data in this way, the drawing data processing unit 103-7 converts the document file (drawing data) in step S805 to step S809.

In step S805, by using the standard combination table 1000 illustrated in FIG. 12, the print setting data processing unit 103-6 determines whether the print setting data and the document file (drawing data) which is originally input by the user constitute a standard combination. When the print setting data processing unit 103-6 determines that they constitute a standard combination (YES in step S805), there is no more necessary processing, so that this processing ends.

In step S805, when it is determined that they does not constitute a standard combination (NO in step S805), the flow proceeds to step S806. In step S806, by using the standard combination table 1000 illustrated in FIG. 12, the print setting data processing unit 103-6 determines whether the document file (drawing data) corresponds to a predetermined standard drawing data format. When the print setting data processing unit 103-6 determines that it is a standard drawing data format (YES in step S806), the flow proceeds to step S807. When it is determined that it is other than a standard drawing data format (NO in step S806), the flow proceeds to step S808. The standard drawing data format is the document file format described in the drawing data format 1003 illustrated in FIG. 12.

When the flow comes to step S807, although the document file (drawing data) is a standard drawing data format, the combination with the print setting data format is not included in a standard combination. In other words, the combination is not described in the standard combination type 1001.

Therefore, it is necessary that the document file (drawing data) is converted into a corresponding another format document file (drawing data) so that the combination is one of the combinations in the combination type 1001 of the standard combination table 1000 illustrated in FIG. 12.

In step S807, the drawing data processing unit 103-7 analyzes the document file (drawing data), and determines whether the drawing data can be converted into a format included in a standard combination with the print setting data. Specifically, the drawing data processing unit 103-7 performs determination by using the drawing data format support management table 920 illustrated in FIG. 15.

FIG. 15 illustrates an example of the drawing data format support management table managed by the drawing data processing unit 103-7 illustrated in FIG. 2. The following description will be described by using an example of a case where the print setting data is the print setting data format B, and the document file (drawing data) is the drawing data format A.

In this case, the document file (drawing data) needs to be converted from a document file (drawing data) of the drawing data format A to a document file (drawing data) of the drawing data format B.

First, the drawing data processing unit 103-7 analyzes the document file (drawing data), and determines whether each drawing item in the drawing items 921 is supported by the drawing data format B. It is determined that an item marked with "x" in the column of the drawing format A 913 cannot be converted.

In step S807, when the drawing data processing unit 103-7 determines that there is no drawing item which cannot be converted (YES in step S807), the flow proceeds to step S808. When it is determined that there is at least one item which cannot be converted (NO in step S807), the flow proceeds to step S809.

In step S808, the drawing data processing unit 103-7 converts the drawing data format (document file format) into a format included in a standard combination with the print setting data format (a combination described in the combination type 1001) by using a document file (drawing data) conversion engine. Here, an example of a method for converting the drawing data format (document file format) from XPS to PDF will be described.

FIG. 16 illustrates a page of data in an XPS document handled by a management apparatus according to an exemplary embodiment of the present invention.

In FIG. 16, a command to draw a bitmap specified by "ImageBrush" is "Fill". This XPS data is XPS data for only drawing an image. The result of converting this drawing content into PDF is illustrated in FIG. 17.

FIG. 17 illustrates an example of a PDF document handled by the information processing apparatus according to an exemplary embodiment of the present invention.

As illustrated in FIG. 17, in this PDF document, information of how many pages are in the document file (drawing data) and what drawing commands are in each page is stored in "PDF configuration information".

In this example, in the first page of PDF having one page, there is "Drawing execution command", and an image specified by the drawing execution command is stored in "Image data".

When performing conversion of image drawing, it is possible to convert from XPS to PDF by defining a rule of replacing the image data specified by "ImageBrush" with the "Image data", and converting a drawing command "Fill" into the "Drawing execution command".

Regarding path drawing and text drawing, they can be converted by defining a conversion rule like the image drawing, and converting them according to the rule. The conversion method is not specified, so that the method does not need to be the above method.

On the other hand, when the drawing data processing unit 103-7 determines that conversion cannot be performed (NO in step S807), the flow proceeds to step S809. In step S809, the drawing data processing unit 103-7 once converts the document file (drawing data) into image data, such as bitmap, and converts the data into the drawing data format (document file format) included in a standard combination with the print setting data format.

In other words, conversion is performed so that the content of the drawing data format (document file format) is constituted by pages, each of which has only a single image.

As an example of the conversion method, by issuing a print instruction (example: GDI) from an application which can interpret the document file (drawing data) via object linking and embedding (OLE), the print instruction is interpreted and a bitmap is generated. Here, as an example of the application, when the drawing data is Microsoft Word data, the application is Microsoft Word.

Next, conversion can be performed by performing processing in which the drawing data processing unit 103-7 encloses the generated bitmap with the standard drawing data format (document file format).

For example, when the standard drawing data is XPS, it is converted into the document file (drawing data) as illustrated in FIG. 16. FIG. 16 illustrates a part which represents page data in an XPS document, and it is XPS data for only drawing an image. The bitmap specified by "ImageBrush" in FIG. 16 is bitmap data generated via GDI. The conversion method is not specified, so that the method does not need to be the above method.

Hereinafter, with reference to FIGS. 18 and 19, processing for printing the document file registered in the document management system 103 based on a print instruction from the user using the operation panel 104-111 of the printing apparatus 104 will be described.

In the exemplary embodiment, the document management system 103 is configured to process a plurality of combinations as standard formats which are specified by the print setting data and the document file (drawing data). Specifically, in the exemplary embodiment, the document management system 103 is configured to process two different standard formats: the standard A and the standard B by the standard combination table 1000 illustrated in FIG. 12. In the standard A, the print setting data format is the print ticket, and the drawing data format (document file format) is XPS. In the standard B, the print setting data format is JDF, and the drawing data format (document file format) is PDF.

Figure 18:
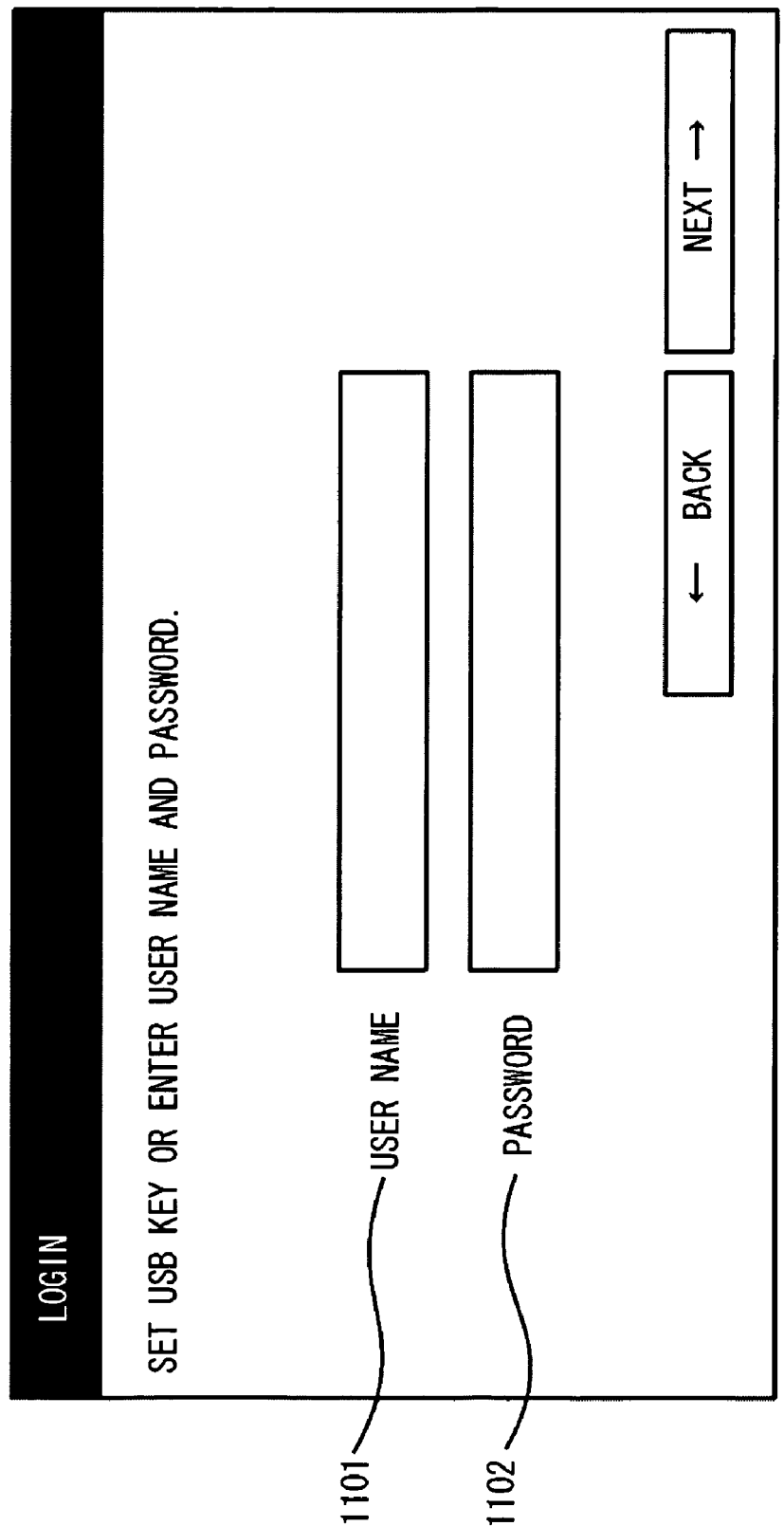
FIG. 18 illustrates an example of a user interface which can be displayed by a printing apparatus illustrated in FIG. 2.
Figure 19:
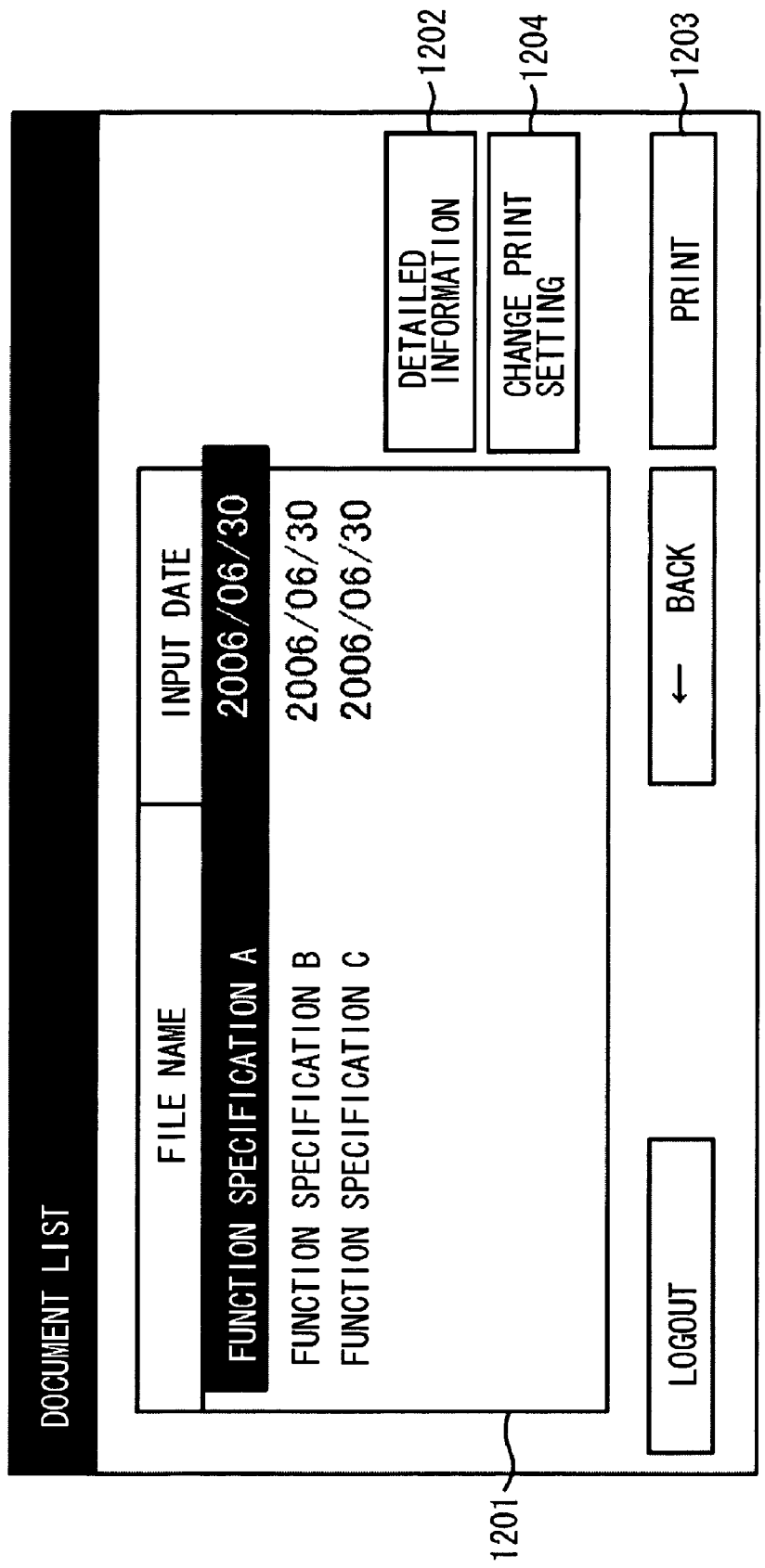
FIG. 19 illustrates an example of a user interface which can be displayed by the printing apparatus illustrated in FIG. 2.

FIGS. 18 and 19 each illustrate an example of a user interface which can be displayed by the printing apparatus 104 illustrated in FIG. 2. FIG. 18 corresponds to a login screen, and FIG. 19 corresponds to a document list screen on which document selection is performed, both of which are displayed on a screen in the operation panel 104-111. The CPU 104-102 executes the print instruction application 104-112 and displays a user interface, an example of which is illustrated in FIGS. 18 and 19, on the operation panel 104-111.

The user operates the operation panel 104-111 attached to the printing apparatus 104 and performs a document print request via the print instruction application 104-112.

The CPU 104-102 executes the print instruction application 104-112 and displays a login screen illustrated in FIG. 18 on the operation panel 104-111 to log into the document management system 103.

When the user enters the user name (login ID) 1101 and the password 1102 into the login screen illustrated in FIG. 18, the print instruction application 104-112 transmits the login ID and the password to the output I/F unit 103-5.

The output I/F unit 103-5 of the document management system 103 receives the login ID and the password, specifies this information to the document information management unit 103-2, and requests acquisition of a document information list. The document information management unit 103-2 sends an authentication processing request based on the user ID obtained from the printing apparatus 104 to the user management unit 103-4. The user management unit 103-4 receives the authentication processing request and searches the user information associated with the user ID. The user management unit 103-4 confirms that the user is registered to the system and checks whether the password obtained from the printing apparatus is valid. It is possible to adopt the configuration in which the user ID, password, etc., are encrypted in specified code in the printing apparatus 104 and decrypted in the document management system 103, and then the authentication processing is performed.

When the password is valid, the login is permitted. Otherwise, the login screen illustrated in FIG. 18 is displayed again.

When the login is permitted based on the input user information, successively, the document information management unit 103-2 searches documents registered by the authenticated user, and generates a document information list. Then, the document information management unit 103-2 transmits the generated document information list to the output I/F 103-5.

Then, the output I/F 103-5 transmits the document information list to the print instruction application 104-112 of the printing apparatus 104 and displays the document list using a user interface, an example of which is illustrated in FIG. 19, on the operation panel 104-111.

In displaying the document information list, a display format of the file name to be displayed can be determined based on user-predetermined display attributes, for example, one of a registration date, a data size, and the number of print times, or a combination thereof.

In FIG. 19, the user can select a document which the user wants to print from the document list 1201 (also a plurality of document can be selected), and by pressing the detail button 1202, detailed information of the selected document can be displayed. Reference numeral 1204 denotes a change print setting button.

When a print button 1203 for starting printing is pressed in a state in which a document is selected, the print instruction application 104-112 specifies a document ID to the output I/F unit 103-5 and outputs a document file acquisition request to the document management system 103. Responding to this, the output I/F unit 103-5 issues the document file acquisition request to the document information management unit 103-2.

Next, the document information management unit 103-2 searches document information of the document associated with the specified document ID, acquires a registered user ID 1503 from the document information, and transmits it to the user management unit 103-4. The user management unit 103-4 compares the user ID 1530 acquired from the document information management unit 103-2 with the user ID 1101 of a user who currently logs in. When the document information management unit 103-2 determines that the registered user ID 1503 corresponds with the user ID 1101, the document information management unit 103-2 transmits the print setting data and the document file (drawing data) to the printing apparatus 104 via the output I/F unit 103-5.

The printing apparatus 104 prints the received document file (drawing data) according to the settings of the received print setting data.

In a second exemplary embodiment, processing of printing is different from that of the first exemplary embodiment.

There may be a case where the user does not want to print with the print setting data and the document file (drawing data) which the user registered, but the user wants to change the print setting during printing.

For example, when each user wants to print by using the print setting which is frequently used, there is a case where the print setting data which has already been input is not used, user-specific print setting data for each user is held, not for each document file (drawing data), and the user prints the document file (drawing data) with the setting for each user. The user-specific print setting is a setting by the "favorites" function in a printer driver.

In this case, printing cannot be performed well in an environment in which a plurality of print setting data formats and drawing data formats (document file formats) can be handled. Here, the user-specific print setting data corresponds to the print setting data which the user sets for printing.

For example, presume that the user-specific print setting data format is the print setting data format A, and the registered drawing data is the drawing data format B. In this case, since the combination of the print setting data format and the drawing data format is a combination type 1001 that is not described in the standard combination table 1000, printing cannot be performed with that combination.

In the exemplary embodiment, since the process flow until registering the document in the document management system 103 is similar to that of the first exemplary embodiment, the description is not repeated. The process flow during printing will be described below.

The user logs in using the screen illustrated in FIG. 18 and selects a document to be printed from the document list illustrated in FIG. 19.

In FIG. 19, the user presses the change print setting button 1204 for changing the print setting, in a state in which the user selects a document to be printed from the documents displayed in the document list. Thus, the user can change the print setting data which was previously associated with the document when the document was registered into print setting data which the user desires. By pressing the start button 1203, the printing processing is executed. Since only the processing of changing the print setting is different from the first exemplary embodiment, the print setting change processing will be described here. Since other processing is similar to that of the first exemplary embodiment, the description is not repeated.

In the screen illustrated in FIG. 19, when the user presses the change print setting button 1204, a list of the print setting data registered in the user-specific print setting data 1604 in the user information 1600 illustrated in FIG. 3 is displayed on a print setting data list display screen (not illustrated).

The user selects user-specific print setting data from the list and goes back to the document list screen illustrated in FIG. 19.

When the user presses the start button 1203, print setting data/document file (drawing data) conversion processing is performed in the print setting data processing unit 103-6 and the drawing data processing unit 103-7. The processing is described in detail using a flowchart illustrated in FIG. 20.

Figure 20:
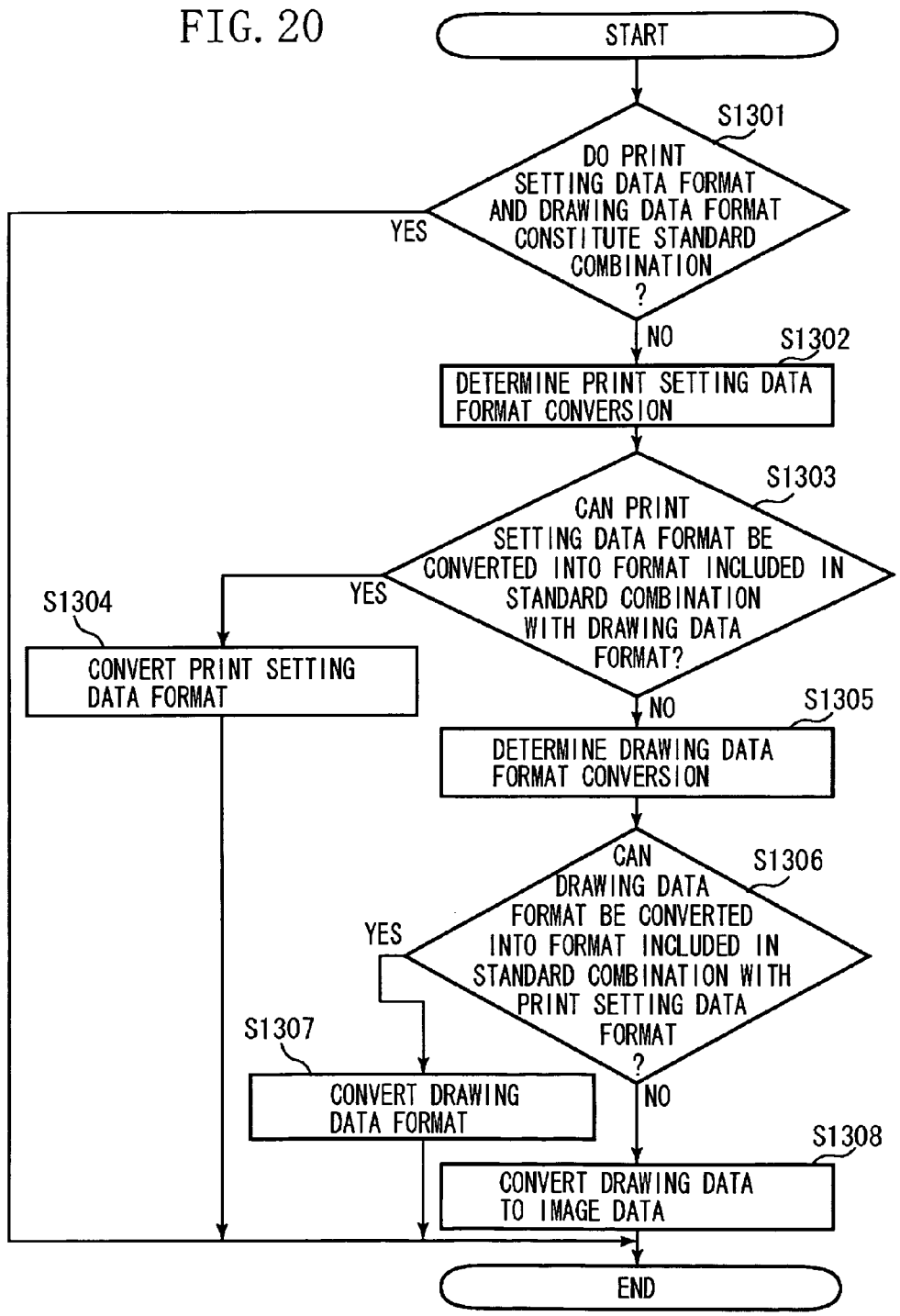
FIG. 20 is a flowchart illustrating an example of a data processing procedure in the information processing apparatus according to an exemplary embodiment of the present invention.

FIG. 20 is a flowchart illustrating an example of a data processing procedure in the information processing apparatus according to an exemplary embodiment of the present invention. This is an example of print setting data generation processing and document file (drawing data) conversion processing by the print setting data processing unit 103-6 and the drawing data processing unit 103-7. Each step is implemented by the CPU of the document management system 103 executing the print setting data processing unit 103-6 and the drawing data processing unit 103-7.

In step S1301, the print setting data processing unit 103-6 determines whether the document file (drawing data) which the user selects from the document list illustrated in FIG. 19 and the user-specific print setting data constitute a standard combination. Specifically, the print setting data processing unit 103-6 determines whether the combination is one of the combinations described in the combination type 1001 of the standard combination table 1000 illustrated in FIG. 12. When the print setting data processing unit 103-6 determines that the combination is a standard combination (YES in step S1301), there is no more necessary processing, and this processing ends.

On the other hand, in step S1301, when the print setting data processing unit 103-6 determines that the combination is not a standard combination (NO in step S1301), the flow proceeds to step S1302.

In step S1302, the print setting data processing unit 103-6 determines whether the print setting data format can be converted into a print setting data format described in the combination type 1001 corresponding to the print target drawing data format (document file format) selected by the user. For example, when the document file (drawing data) is the drawing data format A, the print setting data processing unit 103-6 determines whether the print setting data format can be converted into the print setting data format A, and when the document file (drawing data) is the drawing data format B, the print setting data processing unit 103-6 determines whether the print setting data format can be converted into the print setting data format B.

For the determination, the print setting support management table 900 illustrated in FIG. 13 is used. For example, whether the conversion from the print setting data format A to the print setting data format B can be performed is determined as follows:

When there is at least one "x" for each print setting item in the print setting data format B in the print setting support management table 900 in FIG. 13, it is determined that the conversion is impossible. In other words, it is determined that an item which cannot be represented by the print setting data format B is included.

When the document file (drawing data) is a format which is not described in the drawing data format 1003, the conversion processing of the print setting data format is not performed (the drawing data is converted to be included in a standard combination with the print setting data format). In this case, the determination result of step S1302 indicates that conversion cannot be performed.

Next, in step S1303, the print setting data processing unit 103-6 determines whether the print setting data format can be converted into a format included in a standard combination with the drawing data format (document file format). When the print setting data processing unit 103-6 determines that the print setting data format can be converted (YES in step S1303), the flow proceeds to step S1304, and when determining that the print setting data format cannot be converted (NO in step S1303), the flow proceeds to step S1305.

In step S1304, the print setting data processing unit 103-6 converts the print setting data format into a corresponding data format. For example, when the document file (drawing data) is the drawing data format A, the print setting data processing unit 103-6 converts the print setting data format into print setting data of the print setting data format A, and when the document file (drawing data) is the drawing data format B, the print setting data processing unit 103-6 converts the print setting data format into print setting data of the print setting data format B, and then, the process ends.

As a conversion example, a conversion method from the print ticket to JDF will be briefly described below.

FIGS. 21 and 22 illustrate an example of a print setting file handled by the information processing apparatus according to an exemplary embodiment of the present invention. FIG. 21 illustrates the print setting file by the print ticket, and FIG. 22 illustrates the print setting file by JDF.

The print setting files illustrated in FIGS. 21 and 22 correspond to a case where the print size is A4, the print side is one-sided, the page layout is 1 page/sheet, and the color/monochrome is color.

In the exemplary embodiment, by providing a conversion table (not illustrated) corresponding to each setting item, in the print setting data processing unit 103-6, the conversion from the print ticket to JDF can be performed. FIGS. 21 and 22 are schematic views of each print setting file and do not correctly represent the actual specification of each format. Hereinafter, the description refers back to FIG. 20.

As mentioned above, in step S1303, when the print setting data processing unit 103-6 cannot change the print setting data format (NO in step S1303), the flow proceeds to step S1305. In step S1305, it is determined whether the drawing data format (document file format) can be converted into a drawing data format corresponding to the combination type 1001 of the standard combination table 1000. In step S1306, the data processing part 103-7 determines whether the drawing data of the drawing data format (document file format) can be converted into drawing data of a format included in a standard combination with the print setting data format.

For example, when the print setting data is the print setting data format A, the drawing data processing unit 103-7 determines whether the drawing data can be converted into drawing data of the drawing data format A, and when the print setting data is the print setting data format B, the drawing data processing unit 103-7 determines whether the drawing data can be converted into drawing data of the drawing data format B.

This determination is performed by the drawing data processing unit 103-7 using the drawing data format support management table 920 illustrated in FIG. 15.

For example, whether the conversion from the drawing data format A to the drawing data format B can be performed is determined as follows: The drawing data processing unit 103-7 analyzes the drawing data and determines whether each drawing data corresponding to the drawing items 911 is supported by the drawing data format B. For example, it is determined that an item marked with "x" in the column of the drawing format A 913 cannot be converted.

When the document file (drawing data) is a format which is not described in the drawing data format 1003, the document file (drawing data) is converted to be included in a standard combination with the print setting data format. In this case, the determination result of step S1306 indicates that conversion can be performed.

In step S1306, when the drawing data processing unit 103-7 determines that the document file (drawing data) format can be converted into a standard combination format (YES in step S1306), the flow proceeds to step S1307, and when it is determined that the document file (drawing data) format cannot be converted into a standard combination format (NO in step S1306), the flow proceeds to step S1308.

In step S1307, the drawing data processing unit 103-7 converts the drawing data format (document file format) to be included in a standard combination with the print setting data format by using a document file (drawing data) conversion engine, and then, this processing ends. Here, the standard combination is a combination in the print setting data/drawing data standard combination table 1000.

In step S1306, when the drawing data processing unit 103-7 determines that it cannot be converted (NO in step S1306), the drawing data processing unit 103-7 once converts the document file (drawing data) into image data, such as bitmap, in step S1308. In short, the document file (drawing data) format is converted into a drawing data format (document file format) corresponding to a standard combination, and then the process ends. Here, converting into a drawing data format (document file format) corresponding to a standard combination is performed such that a content of the drawing data format (document file format) will be only a single image in each page. The configuration other than the above is similar to that of the first exemplary embodiment.

According to the exemplary embodiment, in registering a document, if there is the same print setting data having different standard formats from each other, a format of the print setting data to be registered is determined according to the document file (drawing data). Therefore, print quality of the drawing data during printing can be prevented from being degraded.

In addition, in an environment in which a plurality of print setting data formats and drawing data formats (document file formats) can be handled, the user can generate a print setting data format and a drawing data format (document file format) included in a standard combination without the need to consider formats.

Further, even if a specified print setting data format and drawing data format (document file format) do not constitute a standard combination, they can be automatically converted into a standard combination. In addition, by converting the print setting to a print setting which less affects the document file (drawing data), printing can be performed without degrading print quality as much as possible. In addition, by not converting the document file (drawing data) into image data as much as possible, data size can be reduced and a text search function can be performed in a case where data is stored in a printing apparatus for reprinting.

FIG. 23 illustrates a memory map of a storage medium for storing various data processing programs readable by the information processing apparatus according to an exemplary embodiment of the present invention.

Although not illustrated in figures, the storage medium can store information for managing the programs stored in the storage medium, for example, version information, author name, and the like, and the storage medium can also store information depending on an OS which reads the programs, for example, icons for identifying and displaying the programs.

Furthermore, data belonging to various programs is managed in directories of the storage medium. In addition, a program for installing various programs on a computer and a program for decompressing a compressed program to be installed can be stored.

The functions illustrated in FIGS. 11 and 20 in the exemplary embodiments can be executed by a host computer using a program externally installed. The present invention can also be applied to a case where an information group including a program is provided to an output apparatus by a storage medium, such as a compact disc read-only memory (CD-ROM), a flash memory, and a flexible disk (FD) or by an external storage medium via a network.

In this way, a storage medium in which a software program code realizing the functions of the exemplary embodiments is provided to a system or an apparatus. The present invention can also be achieved by a computer (or CPU, micro processing unit (MPU)) of the system or the apparatus reading and executing the program code stored in the storage medium.

In this case, the program code itself read from the storage medium realizes novel functions of the present invention, and the storage medium which stores the program code constitutes the present invention.

Therefore, when the program has a program function, a program format is not limited, so that object code, a program executed by an interpreter, script data provided to an operating system (OS), and the like can be used.

As a storage medium for providing a program, for example, a floppy disk, a hard disk, an optical disc, an optical magnetic disc, an magneto-optical disc (MO), a CD-ROM, a compact disc recordable (CD-R), a compact disc rewritable (CD-RW), a magnetic tape, a non-volatile memory card, a ROM, and a digital versatile disc (DVD) can be used.

In this case, the program code itself read from the storage medium realizes the functions of the exemplary embodiments, and the storage medium storing the program code constitutes the present invention.

Another method for providing a program is to connect a client computer to a home page (website) on the Internet using a browser of the client computer. The program can be provided by downloading the computer program itself of the exemplary embodiments of the present invention or a file which is compressed and has an automatic installation function from the website to a storage medium such as a hard disk. Furthermore, the providing method can be realized by dividing the program code constituting a program of the exemplary embodiments of the present invention into a plurality of files, and downloading each of the files from different websites. In other words, the present invention includes a world wide web (WWW) server and a file transfer protocol (FTP) server, which enable a plurality of users to download program files for realizing a function processing of the exemplary embodiments of the present invention by a computer.

In addition, the program of the exemplary embodiments of the present invention is encrypted and stored into a storage medium such as a CD-ROM, and then distributed to users. Users who satisfy a predetermined condition are allowed to download key information with which the encrypted code is decrypted from a website via the Internet. The encrypted program is executed and installed in a computer, so that the functions of the exemplary embodiments can be realized.

The functions of the exemplary embodiments are realized not only by executing the program read by the computer. For example, an OS and the like running on the computer can perform all or a part of the actual processing based on an instruction of the program code. The functions of the exemplary embodiments can be realized by that processing.

Furthermore, the program code read from the storage medium can be written into a memory provided in a function expansion board inserted into the computer or a function expansion unit connected to the computer. A CPU, etc., provided in the function expansion board or the function expansion unit can perform all or a part of the actual processing based on an instruction of the program code. The functions of the exemplary embodiments can be realized by that processing.

According to the exemplary embodiments of the present invention, the format of the print setting data by the user and the format of the document file can be processed to correspond to a print setting data format which can be processed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-117188 filed Apr. 28, 2008, which is hereby incorporated by reference herein in its entirety.

What is claimed is:

1. An information processing apparatus comprising:
a determination unit configured to determine whether a combination of print setting data and drawing data is a standard combination; and
a conversion unit configured to convert the drawing data into drawing data of another format or to convert the drawing data into image data if the combination of the print setting data and the drawing data is determined not to be the standard combination by the determination unit and the drawing data can be converted into drawing data of a format corresponding to the print setting data, and is configured to convert the drawing data into image data if the combination of the print setting data and the drawing data is determined not to be the standard combination by the determination unit and the drawing data cannot be converted into drawing data of a format corresponding to the print setting data.

2. An information processing apparatus comprising:
a determination unit configured to determine whether a combination of print setting data and drawing data is a standard combination; and
a conversion unit configured to convert the print setting data into print setting data of another format, or to convert the drawing data into drawing data of another format if the combination of the print setting data and the drawing data is determined not to be the standard combination by the determination unit and the print setting data can be converted into print setting data of another format corresponding to the drawing data, and is configured to convert the drawing data into drawing data of another format if the combination of the print setting data and the drawing data is determined not to be the standard combination and the print setting data cannot be converted into print setting data of another format corresponding to the drawing data.

3. The information processing apparatus according to claim 2, wherein the conversion unit is configured to convert the print setting data into print setting data of another format, to convert the drawing data into drawing data of another format, or to convert the drawing data into image data if the combination of the print setting data and the drawing data is determined not to be the standard combination by the determination unit.

4. An information processing method comprising:
determining whether a combination of print setting data and drawing data is a standard combination;
converting the drawing data into drawing data of another format or converting the drawing data into image data if the combination of the print setting data and the drawing data is determined not to be the standard combination and the drawing data can be converted into drawing data of a format corresponding to the print setting data; and
converting the drawing data into image data if the combination of the print setting data and the drawing data is determined not to be the standard combination and the drawing data cannot be converted into drawing data of a format corresponding to the print setting data.

5. An information processing method comprising:
determining whether a combination of print setting data and drawing data is a standard combination;
converting the print setting data into print setting data of another format or converting the drawing data into drawing data of another format if the combination of the print setting data and the drawing data is determined not to be the standard combination and the print setting data can be converted into print setting data of another format corresponding to the drawing data; and
converting the drawing data into drawing data of another format if the combination of the print setting data and the drawing data is determined not to be the standard combination and the print setting data cannot be converted into print setting data of another format corresponding to the drawing data.

6. The information processing method according to claim 5, further comprising converting the print setting data into print setting data of another format, converting the drawing data into drawing data of another format, or converting the drawing data into image data if the combination of the print setting data and the drawing data is determined not to be the standard combination.

7. A non-transitory computer-readable storage medium storing a program for causing a computer to execute a method comprising:
determining whether a combination of print setting data and drawing data is a standard combination;
converting the drawing data into drawing data of another format or converting the drawing data into image data if the combination of the print setting data and the drawing data is determined not to be the standard combination and the drawing data can be converted into drawing data of a format corresponding to the print setting data; and
converting the drawing data into image data if the combination of the print setting data and the drawing data is determined not to be the standard combination and the drawing data cannot be converted into drawing data of a format corresponding to the print setting data.

8. A non-transitory computer-readable storage medium storing a program for causing a computer to execute a method comprising:
determining whether a combination of print setting data and drawing data is a standard combination;
converting the print setting data into print setting data of another format or converting the drawing data into drawing data of another format if the combination of the print setting data and the drawing data is determined not to be the standard combination and the print setting data can be converted into print setting data of another format corresponding to the drawing data; and
converting the drawing data into drawing data of another format if the combination of the print setting data and the drawing data is determined not to be the standard combination and the print setting data cannot be converted into print setting data of another format corresponding to the drawing data.

9. The non-transitory computer-readable storage medium according to claim 8, wherein the method further comprises converting the print setting data into print setting data of another format, converting the drawing data into drawing data of another format, or converting the drawing data into image data if the combination of the print setting data and the drawing data is determined not to be the standard combination.

* * * * *